(12) United States Patent
Damerow et al.

(10) Patent No.: US 10,166,887 B2
(45) Date of Patent: Jan. 1, 2019

(54) SEATBACK LIFT MECHANISM FOR A SUPINE MOTOR VEHICLE SEATING ASSEMBLY

(71) Applicant: Ford Global Technologies, LLC, Dearborn, MI (US)

(72) Inventors: Robert Lloyd Damerow, Garden City, MI (US); Johnathan Andrew Line, Northville, MI (US); Spencer R. Hoernke, Dundas (CA); Corbin S. Johnston, Winnipeg (CA); Adam D. Ewel, Royal Oak, MI (US); Paul Iacoban, Dearborn, MI (US); Chris Fredriksson, LaSalle (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/915,641

(22) Filed: Mar. 8, 2018

(65) Prior Publication Data

US 2018/0251050 A1    Sep. 6, 2018

Related U.S. Application Data

(63) Continuation-in-part of application No. 15/447,746, filed on Mar. 2, 2017, now Pat. No. 10,065,535.

(51) Int. Cl.
*B60N 2/12* (2006.01)
*B60N 2/22* (2006.01)
(Continued)

(52) U.S. Cl.
CPC .............. *B60N 2/224* (2013.01); *B60N 2/20* (2013.01); *B60N 2/2222* (2013.01); *B60N 2/64* (2013.01); *B60N 2/68* (2013.01)

(58) Field of Classification Search
CPC ........ B60N 2/20; B60N 2/224; B60N 2/2222; B60N 2/64; B60N 2/68
(Continued)

(56) References Cited

U.S. PATENT DOCUMENTS 2,576,343 A    11/1951  Hibbard et al.
3,902,755 A  *  9/1975  Sirot .................... B60N 2/0292
                                                    297/354.13 X (Continued)

FOREIGN PATENT DOCUMENTS

DE   102015116487 A1   4/2016
JP       H0775608 A    3/1995

*Primary Examiner* — Rodney B White
(74) *Attorney, Agent, or Firm* — Vichit Chea; Price Heneveld LLP

(57) ABSTRACT

A motor vehicle comprises an upper back support comprising a substantially U-shaped tubular member pivotally attached at a first end to one of a pair of opposed lateral seatback frame members and pivotally attached at a second end to the other of the pair of opposed lateral seatback frame members, a substantially rigid planar base attached to a central portion of the tubular member, a latch operably coupling the first end of the tubular member to the one of a pair of opposed lateral seatback members to restrain the tubular member in one of a plurality of positions between a stowed position and a fully raised position, and a cushion disposed above the upper back support to form a movable exposed surface.

20 Claims, 23 Drawing Sheets

(51) Int. Cl.
  *B60N 2/20*     (2006.01)
  *B60N 2/68*     (2006.01)
  *B60N 2/64*     (2006.01)

(58) Field of Classification Search
  USPC .............. 297/216.12, 354.11, 354.13, 408
  See application file for complete search history.

(56) References Cited

U.S. PATENT DOCUMENTS

| | | | |
|---|---|---|---|
| 4,626,028 A | 12/1986 | Hatsutta et al. | |
| 4,709,961 A | 12/1987 | Hill | |
| 4,832,400 A | 5/1989 | Aoki et al. | |
| 4,977,973 A | 12/1990 | Takizawa | |
| 5,003,240 A | 3/1991 | Ikeda | |
| 5,011,225 A | 4/1991 | Nemoto | |
| 5,011,226 A | 4/1991 | Ikeda et al. | |
| 5,058,953 A | 10/1991 | Takagi et al. | |
| 5,145,233 A | 9/1992 | Nagashima | |
| 5,364,164 A | 11/1994 | Kuranami | |
| 5,567,011 A | 10/1996 | Sessini | |
| 5,836,648 A | 11/1998 | Karschin et al. | |
| 6,135,558 A | 10/2000 | Behrens et al. | |
| 6,135,561 A | 10/2000 | Krueger et al. | |
| 6,183,033 B1 | 2/2001 | Arai et al. | |
| 6,213,549 B1 | 4/2001 | Wieclawski | |
| 6,273,511 B1 | 8/2001 | Wieclawski | |
| 6,439,636 B1 | 8/2002 | Kuo | |
| 6,478,373 B1 | 11/2002 | Hake et al. | |
| 6,565,150 B2 | 5/2003 | Fischer et al. | |
| 6,565,153 B2 | 5/2003 | Hensel et al. | |
| 6,719,368 B1 | 4/2004 | Neale | |
| 7,025,420 B2 | 4/2006 | Guinea Pena et al. | |
| 7,055,904 B2 | 6/2006 | Skelly et al. | |
| 7,077,472 B2 | 7/2006 | Steffens, Jr. | |
| 7,163,261 B2 * | 1/2007 | Kawashima ....... | B60N 2/42745 297/216.12 X |
| 7,322,646 B2 | 1/2008 | Jammalamadaka et al. | |
| 7,364,231 B2 | 4/2008 | Park et al. | |
| 7,393,052 B2 | 7/2008 | Humer et al. | |
| 7,475,944 B2 * | 1/2009 | Griepentrog ......... | A47C 17/175 297/354.13 X |
| 7,488,035 B2 * | 2/2009 | Kawashima ....... | B60N 2/42745 297/216.12 |
| 7,523,888 B2 | 4/2009 | Ferry et al. | |
| 7,644,982 B2 | 1/2010 | Paluch | |
| 7,845,729 B2 | 12/2010 | Yamada et al. | |
| 7,857,381 B2 | 12/2010 | Humer et al. | |
| 7,934,762 B2 | 5/2011 | Hollenbeck et al. | |
| 8,033,610 B2 | 10/2011 | Graber et al. | |
| 8,052,194 B2 | 11/2011 | Sayama | |
| 8,104,836 B2 | 1/2012 | Little | |
| 8,141,930 B2 | 3/2012 | Sayama | |
| 8,177,281 B2 | 5/2012 | Sayama | |
| 8,201,890 B1 | 6/2012 | Nagoaka Mihara | |
| 8,262,164 B2 | 9/2012 | Ito et al. | |
| 8,287,024 B2 | 10/2012 | Sayama | |
| 8,287,037 B2 | 10/2012 | Sayama | |
| 8,336,955 B2 | 12/2012 | Sayama | |
| 8,388,054 B2 | 3/2013 | Sayama | |
| 8,528,978 B2 | 9/2013 | Purpura et al. | |
| 8,534,750 B2 | 9/2013 | Sayama | |
| 8,540,308 B2 | 9/2013 | Aoki et al. | |
| 8,899,683 B2 | 12/2014 | Ito | |
| 8,998,327 B2 | 4/2015 | Cooney | |
| 10,065,536 B2 * | 9/2018 | Line ...................... | B60N 2/809 |
| 2002/0195846 A1 * | 12/2002 | Masuda ................ | B60N 2/853 297/216.12 |
| 2004/0012234 A1 | 1/2004 | Yamaguchi et al. | |
| 2004/0070240 A1 | 4/2004 | Hland et al. | |
| 2005/0225145 A1 | 10/2005 | Furtado et al. | |
| 2005/0280296 A1 | 12/2005 | Ohchi et al. | |
| 2006/0006709 A1 | 1/2006 | Uno et al. | |
| 2006/0071517 A1 | 4/2006 | Humer et al. | |
| 2006/0202524 A1 | 9/2006 | Yamaguchi | |
| 2006/0202525 A1 | 9/2006 | Yamaguchi et al. | |
| 2008/0012402 A1 | 1/2008 | Sekida | |
| 2008/0073950 A1 | 3/2008 | Ko | |
| 2008/0073951 A1 * | 3/2008 | Hattori ................... | B60N 2/888 297/216.12 |
| 2008/0084098 A1 | 4/2008 | Humer et al. | |
| 2008/0088158 A1 | 4/2008 | Yokota et al. | |
| 2008/0129093 A1 | 6/2008 | Kim | |
| 2009/0167066 A1 | 7/2009 | Mori et al. | |
| 2009/0309398 A1 | 12/2009 | Niitsuma et al. | |
| 2010/0026060 A1 | 2/2010 | Niitsuma et al. | |
| 2010/0066135 A1 | 3/2010 | Humer et al. | |
| 2010/0066136 A1 | 3/2010 | D'Agostini | |
| 2010/0090505 A1 | 4/2010 | Tarusawa et al. | |
| 2010/0127540 A1 | 5/2010 | Park et al. | |
| 2010/0148545 A1 | 6/2010 | Omori | |
| 2010/0187875 A1 | 7/2010 | Sasaki et al. | |
| 2010/0201167 A1 | 8/2010 | Wieclawski | |
| 2010/0264704 A1 | 10/2010 | Yasuda et al. | |
| 2010/0270834 A1 | 10/2010 | Niitsuma | |
| 2010/0270835 A1 | 10/2010 | Nitsuma | |
| 2010/0295348 A1 | 11/2010 | Takayasu et al. | |
| 2010/0308629 A1 | 12/2010 | Lee et al. | |
| 2011/0187167 A1 | 8/2011 | Takayasu et al. | |
| 2011/0272978 A1 | 11/2011 | Nitsuma | |
| 2012/0068517 A1 | 3/2012 | Yetukuri et al. | |
| 2012/0212016 A1 | 8/2012 | Kanda | |
| 2014/0203611 A1 | 7/2014 | Kondrad et al. | |
| 2014/0203614 A1 | 7/2014 | Line et al. | |
| 2014/0203615 A1 | 7/2014 | Little | |
| 2014/0368015 A1 | 12/2014 | Basters et al. | |

* cited by examiner

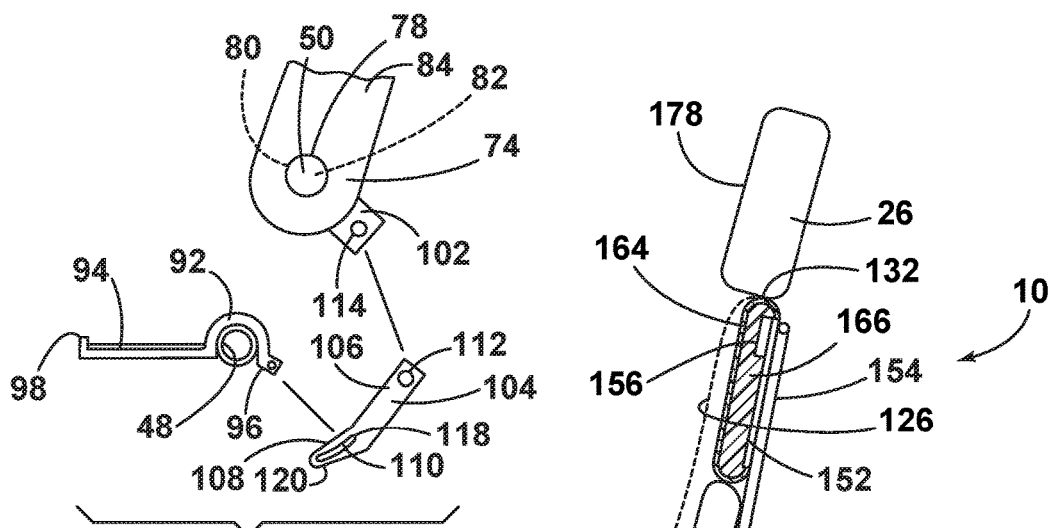
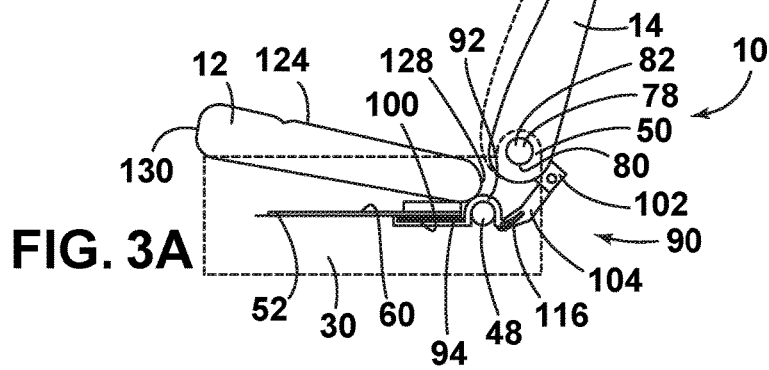
FIG. 3B
FIG. 3A
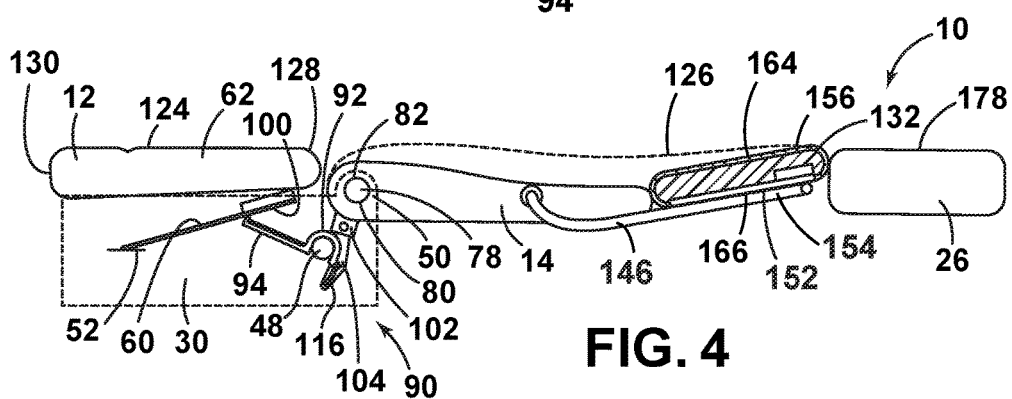
FIG. 4

SEATBACK LIFT MECHANISM FOR A SUPINE MOTOR VEHICLE SEATING ASSEMBLY

CROSS-REFERENCE TO RELATED APPLICATION

This application is a Continuation-in-Part of U.S. patent application Ser. No. 15/447,746, filed Mar. 2, 2017, now U.S. patent Ser. No. 10/065,535 B1, entitled "Seatback Lift Mechanism for a Supine Motor Vehicle Seating Assembly," the entire contents of which are hereby incorporated herein by reference.

FIELD OF THE INVENTION

The present invention generally relates to an apparatus and method for providing a motor vehicle seating assembly adapted to assume a first configuration to provide conventional support and restraint in the operation of motor vehicle, and adapted to assume a second configuration to provide a relatively level supine platform upon which an occupant might lie when the motor vehicle is not in operation and, more particularly, to a manually actuated adjustable seatback upper back support.

BACKGROUND OF THE INVENTION

Motor vehicle seating assemblies provided in modern motor vehicles are primarily designed to provide a support platform designed to accommodate a motor vehicle occupant in a sitting or reclined position, providing support for the motor vehicle occupant's back by which the motor vehicle occupant can safely operate the motor vehicle or travel within the motor vehicle in a comfortable and pleasant manner. Another function of motor vehicle seating assemblies is to assist in restraining the occupant in the event of an impact or rollover event. For example, in the case of a frontal impact event, the motor vehicle seating assembly is particularly adapted to restrain the occupant within a prescribed range of positions so that the motor vehicle's active and passive restraint systems can operate appropriately.

In the case of the lower seating structure of the motor vehicle seating assembly, the lower seating structure is typically downwardly inclined in a rearward direction toward the bite line of the motor vehicle seating assembly to provide an ergonomic seating platform. This configuration also serves to assist in positioning the H-point of the motor vehicle occupant of the motor vehicle seating assembly, whereby in the event of a frontal impact event, the forward momentum of the motor vehicle occupant generates a force against the lower seating assembly, which tends to retain the motor vehicle occupant in a position, where the active restraint system comprising the seatbelt assembly and the passive restraint system comprising one or more airbags can be most effectively employed.

However, modern motor vehicle seating assemblies typically do not address the needs of motor vehicle occupants when the vehicle is parked and the motor vehicle occupant wants to rest or sleep. Due to the mechanisms widely in use to provide a seatback recline feature, the seatback may cause significant discomfort when it moves from a driving/use design position to a resting/sleeping position. In particular, existing reclining features tend to create a substantial vertical gap between the lower seating structure and the seatback with the seatback in the fully reclined position. Likewise, the seatback often fails to provide sufficient upper back support when in the fully reclined position. Features are needed to make the motor vehicle occupant more comfortable and relaxed. Mechanisms that provide a relatively level supine platform and adequate upper back support are desired.

SUMMARY OF THE INVENTION

According to one aspect of the present invention, a seatback comprises a pair of frame members and an upper back support further comprising a tubular member pivotally attached to the pair of frame members, a support surface attached to the tubular member, and a latch operably coupling a first end of the tubular member to the one of the frame members to restrain the tubular member in one of a plurality of positions between a stowed position and a fully raised position.

Embodiments of the first aspect of the invention can include any one or a combination of the following features:
- a support surface comprising a substantially rigid planar base;
- a stowed position about 0° relative a plane of the seatback and a raised position about 15° relative the plane of the seatback;
- a plurality of positions of the upper back support in intervals of 1.5° between the stowed position and the fully raised position;
- a latch comprising a ratchet gear and ratchet pawl operably coupled with the ratchet gear, wherein displacement of the upper back support beyond the fully raised position actuates the ratchet pawl to an over travel condition to return the ratchet latch and the upper back support to the stowed position;
- an upper back support manually controlled by pulling the upper back support forward relative the seatback;
- a pull strap by which the upper back support is pulled forward relative the seatback;
- an upper back support pulled forward in increments of 1.5° between the stowed position and the fully raised position;
- a seatback frame having an upper transverse cross member, a lower transverse cross member, and a pair of opposed lateral seatback frame members extending between the upper and lower transverse members, each of the pair of opposed lateral seatback frame members having a seatback pivot mount at a lower portion thereof that is operably coupled with the lower seat pivot mount;
- a lower back support disposed below the upper back support operably coupled with the upper back support and raised relative a plane of the seatback when the upper back support is raised from the stowed position;
- a tubular member forming a substantially U-shaped and upwardly extending configuration within a plane of the seatback when in the stowed position and a substantially rigid planar base attached to the central portion of the tubular member;
- a head restraint having an exposed surface and a cushion disposed above the upper back support to form a movable exposed surface, and the exposed surface of the head restraint and the movable exposed surface of the upper back support forming a substantially continuous plane when the upper back support surface is in the raised position;
- a raised support proximate an upper edge of the substantially rigid planar base and disposed beneath a cushion;

an upper back support disposed centrally between a first and second lateral edge of the seatback and below the heat restraint; and a foam pad and a resilient trim material disposed about the foam pad to maintain a flat surface and eliminate wrinkling between the stowed position and the fully raised position.

According to another aspect of the present invention, a seating assembly for a motor vehicle comprises a seatback pivotable between an upright position and a fully reclined position operably coupled with a lower seating structure, the seatback further comprising a frame having an upper transverse cross member, a lower transverse cross member, and a pair of opposed lateral seatback frame members extending between the upper and lower transverse members. Each of the pair of opposed lateral seatback frame members has a seatback pivot mount at a lower portion thereof that is operably coupled with the lower seat pivot mount. An upper back support comprising a tubular member is pivotally attached at a first end to one of the pair of opposed lateral seatback frame members and pivotally attached at a second end to the other of the pair of opposed lateral seatback frame members, a substantially rigid planar base is attached to a central portion of the tubular member, a latch operably couples the first end of the tubular member to the one of a pair of opposed lateral seatback members to restrain the tubular member in one of a plurality of positions between a stowed position and a fully raised position, and a cushion is disposed above the upper back support to form an exposed surface.

According to yet another aspect of the present invention, a seating assembly for a motor vehicle comprises an upper back support comprising a substantially U-shaped tubular member pivotally attached at a first end to one of a pair of opposed lateral seatback frame members and pivotally attached at a second end to the other of the pair of opposed lateral seatback frame members, a substantially rigid planar base attached to a central portion of the tubular member, a latch operably coupling the first end of the tubular member to the one of a pair of opposed lateral seatback members to restrain the tubular member in one of a plurality of positions between a stowed position and a fully raised position, and a cushion disposed above the upper back support to form a movable exposed surface.

According to another aspect of the present invention, a vehicle seating assembly includes a headrest and a seatback including a central portion and first and second lateral edges. The seatback is operable between an upright position and a reclined position. An upper back support includes a tubular member operably coupled between a bushing and a ratchet latch. The upper back support is adjustably securable in a plurality of positions by the ratchet latch. The vehicle seating assembly also includes a ratchet drive bracket. The tubular member is coupled to the ratchet drive bracket, the ratchet drive bracket is coupled to a drive gear of the ratchet latch, and movement of the tubular member between a stowed position and a fully deployed position causes the ratchet drive bracket to move the ratchet drive gear relative to a stationary gear.

Embodiments of the fourth aspect of the invention can include any one or a combination of the following features:
  a ratchet mounting bracket, wherein the ratchet mounting bracket secures the ratchet latch to a first bracket proximate the first lateral edge;
  a ratchet drive pin, wherein the ratchet drive pin secures the ratchet latch to the frame member;
  the ratchet drive bracket is selectively rotatable about the ratchet drive pin to move the ratchet drive gear relative to the stationary gear;
  the ratchet mounting bracket retains the ratchet drive gear and the stationary gear to the frame member;
  the ratchet mounting bracket retains the ratchet drive gear and the stationary gear in an engaged position;
  the ratchet drive gear comprises a first toothed portion, the stationary gear comprises a second toothed portion, and the first toothed portion and the second toothed portion are enmeshed and selectively positionable in a plurality of predetermined positions between the stowed position and the fully deployed position;
  the stowed position is about 0° relative to a plane of the seatback and the fully deployed position is about 15° relative to the plane of the seatback;
  the plurality of predetermined positions comprise intervals of 1.5° between the stowed position and the fully deployed position;
  an extension spring comprising a first end and a second end, wherein the first end is fixed to the tubular member and the second end is fixed to the ratchet mounting bracket and wherein the extension spring returns the upper back support from beyond a fully deployed position to a stowed position; and
  an extension spring comprising a first end and a second end, wherein the first end is fixed to the tubular member and the second end is fixed to the frame member and wherein the extension spring returns the upper back support from beyond a fully deployed position to a stowed position.

According to yet another aspect of the present invention, a seatback includes first and second frame members. The seatback also includes an upper back support. The upper back support includes a tubular member and a supporting member. The upper back support is located between the first and second frame members and is pivotably coupled to the first and second frame members. The seatback includes a drive bracket. The tubular member is coupled to the drive bracket, and the drive bracket is pivotably coupled to a ratchet pin that is coupled to the first frame member. The seatback also includes a ratchet mounting bracket. The ratchet mounting bracket secures a ratchet latch to the first frame member. The ratchet mounting bracket is coupled to the first frame member with the ratchet pin and a second attachment. A deployment force is exerted on the tubular member and causes the drive bracket and a drive gear to rotate about the drive pin relative to a stationary gear. The drive gear and the stationary gear are selectively engageable to place the tubular member in one of a plurality of predetermined positions.

Embodiments of the fifth aspect of the invention can include any one or a combination of the following features:
  the plurality of predetermined positions comprise a stowed position, a raised position, and/or an overtravel position;
  the plurality of predetermined positions further comprise intervals of 1.5° between the stowed position and the raised position;
  the supporting member comprises a first edge proximate a first lateral member of the seatback, a second edge proximate a second lateral member of the seatback, and a top edge proximate an upper transverse cross member of the seatback; and the supporting member comprises a thermoplastic material forming a paddle member extending from an upper edge of the tubular member to the first edge, the second edge, and the top edge.

According to yet another aspect of the present invention, a mounting assembly for attaching a pivotable upper back support to a vehicle seatback frame includes a first bracket, a second bracket, and a ratchet latch. The ratchet latch is coupled to the first bracket with a ratchet mounting bracket. The mounting assembly for attaching a pivotable back support to a vehicle seatback frame also includes a bushing coupled to the second bracket. The upper back support also includes a support member pivotably coupled to the ratchet latch and the bushing.

Embodiments of the sixth aspect of the invention can include any one or a combination of the following features:
- a ratchet drive pin, wherein the ratchet drive pin retains the ratchet mounting bracket to the first bracket;
- a fully raised position includes alignment of a top surface of the upper back support with a top surface of a headrest, wherein the headrest is operably coupled to the vehicle seatback frame;
- the support member comprises a u-shaped tubular member with an overmolded thermoplastic paddle member; and
- the ratchet latch is selectively positionable in a plurality of predetermined intermittent positions to arrange the upper back support between a stowed position and the fully raised position and wherein a spring force retracts the upper back support from beyond the fully raised position to the stowed position when the upper back support is beyond the fully raised position.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 3A is a side view of the hip lifter mechanism of the automotive seat assembly of FIG. 1, wherein the seatback is in the upright position and the upper back support is in its stowed position;

FIG. 3B is a side schematic view of the hip lifter mechanism of the automotive seat assembly of FIG. 1, wherein the seatback is in the upright position;

FIG. 4 is side view of the hip lifter mechanism of the automotive seat assembly of FIG. 1, wherein the seatback is in the fully reclined position and the upper back support is in its fully raised position;

DETAILED DESCRIPTION OF THE PREFERRED EMBODIMENTS

Figure 1:
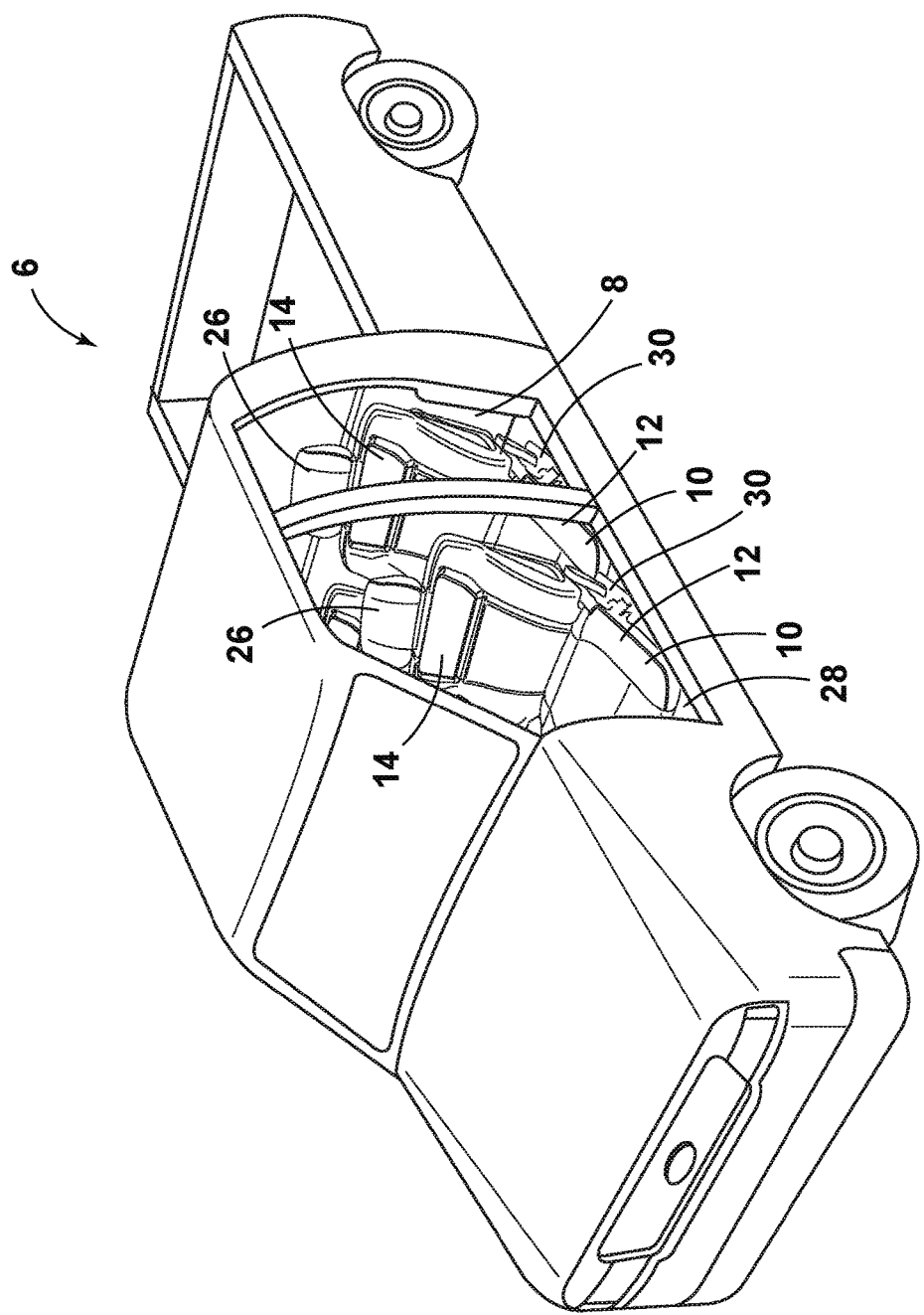
FIG. 1 is a front side perspective view of an automotive seat assembly installed in a motor vehicle in accordance with the present disclosure, wherein the seatback of the front seating assembly is in the upright position.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
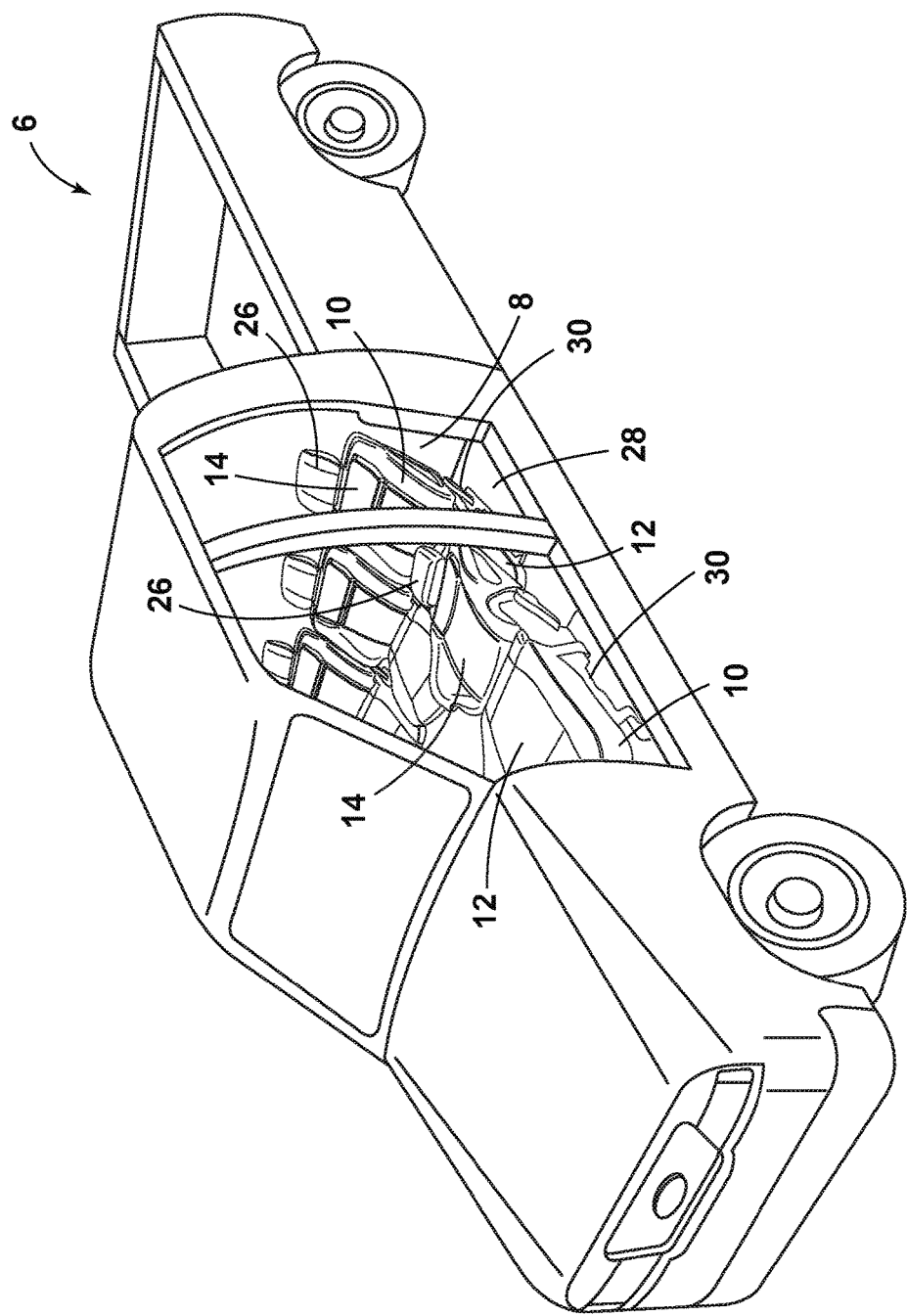
FIG. 2 is a front side perspective view of the automotive seat assembly of FIG. 1, wherein the seatback of the front seating assembly is in the fully reclined position.

Referring to FIGS. 1-4, reference numeral 10 generally designates a vehicle seating assembly for use in a vehicle cabin 8 of a motor vehicle 6. The motor vehicle seating assembly 10 includes a lower seating structure 12 pivotably coupled to a raised seatback 14. As shown in FIGS. 1-2, the motor vehicle seating assembly 10 is generally configured for use in a variety of motor vehicles 6 in a front driver seat, a front passenger seat, or a rear seat of the motor vehicle 6 and generally includes the aforementioned lower seating structure 12 and raised seatback 14. A head restraint 26 is also mounted to the top of the raised seatback 14. The motor vehicle seating assembly 10 may be configured to be mounted on a support surface, such as a floor pan 28 of the vehicle 6. A seat track assembly 30 may be coupled to the lower seating structure 12 to facilitate fore and aft positioning of the motor vehicle seating assembly 10, as is known. The motor vehicle seating assembly 10 is generally designed for the comfort of a motor vehicle occupant, as well as to accommodate and protect the motor vehicle occupant during a collision event.

Figure 7:
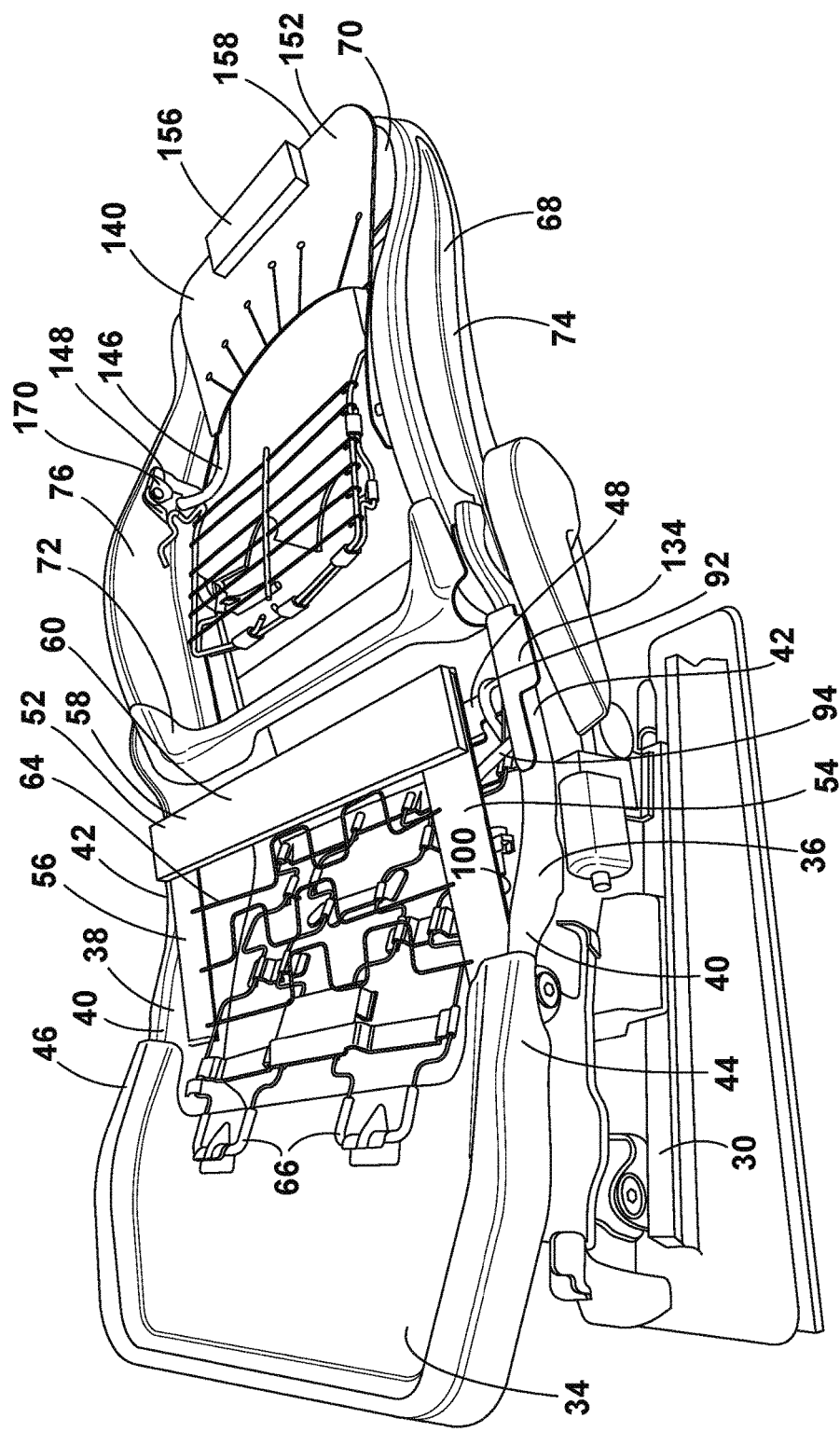
FIG. 7 is a side perspective view of the hip lifter mechanism with the link installed and the upper back support of the automotive seat assembly in the stowed position of FIG. 1, wherein the seatback is in the fully reclined position.

As best shown in FIG. 7, the lower seating structure 12 includes a forward seat pan 34 and a pair of opposed lateral lower seat frame members 36, 38 having forward and rearward ends 40, 42 attached to opposed lateral edges 44, 46 of the forward seat pan 34 at the forward ends 40 of the opposed lateral lower seat frame members 36, 38. A pivot bar 48 extends laterally between and is fixedly attached to the rearward ends 42 of the opposed lateral lower seat frame members 36, 38. Preferably, the forward seat pan 34 and frame members 36, 38 are fabricated from relatively lowweight and high-strength metal components, such as highstrength steel or aluminum. A lower seat pivot mount 50 is mounted at the rearward end 42 of the opposed lateral lower seat frame members 36, 38.

Figure 5:
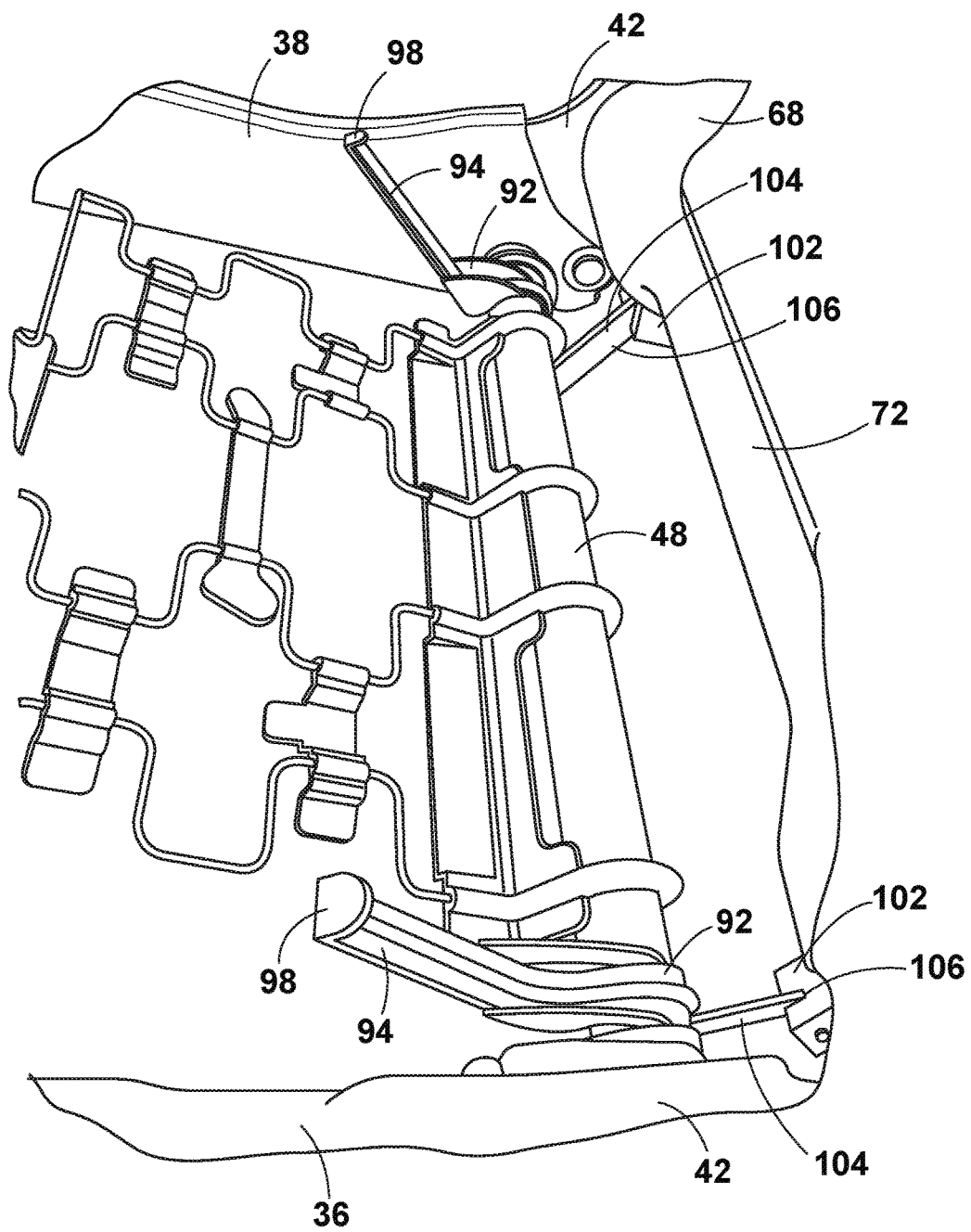
FIG. 5 is a side perspective view of the hip lifter mechanism of the automotive seat assembly of FIG. 1.
Figure 8:
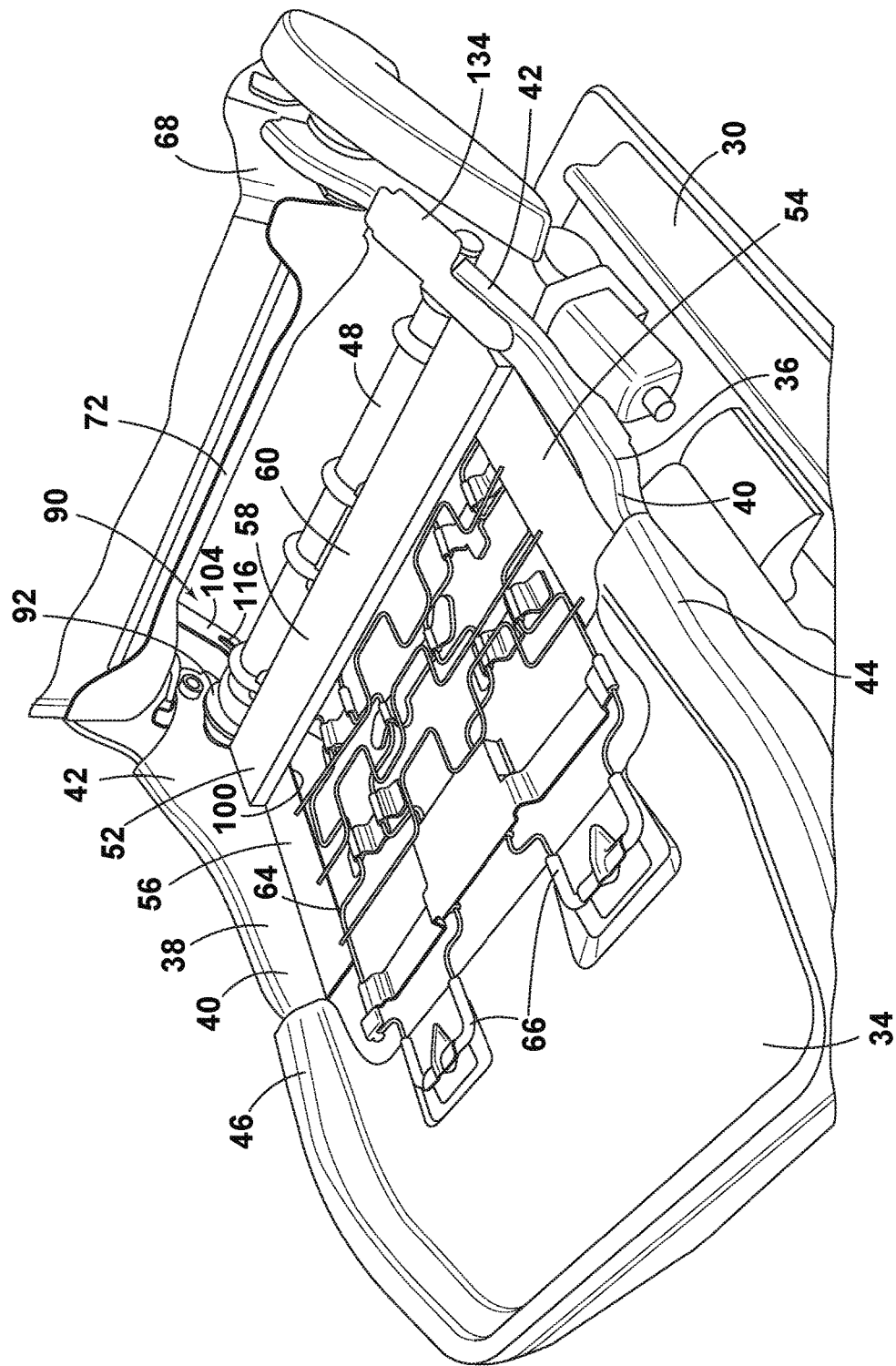
FIG. 8 is a partial front view of the hip lifter mechanism and cushion suspension system of the automotive seat assembly of FIG. 1.

A cushion suspension system 52 is attached to the forward seat pan 34 and adjustably supported between the pair of opposed lateral lower seat frame members 36, 38. The cushion suspension system 52 includes a pair of lateral opposed suspension frame members 54, 56 and a suspension cross member 58 extending between the pair of lateral opposed suspension frame members 54, 56. The pair of lateral opposed suspension frame members 54, 56 and the suspension cross member 58 of the cushion suspension system 52 form an upper surface 60 in contact with and supporting a cushion foam and trim assembly 62. At least one of the pair of opposed suspension frame members 54, 56 form a lower surface 100 of the cushion suspension system 52, as further discussed below. The cushion suspension system 52 further comprises a plurality of resilient members 64, such as bent spring wires, extending between the pair of lateral opposed suspension frame members 54, 56 that provide further support for the cushion foam and trim assembly 62. As shown in FIGS. 5, 7, and 8, a forward portion 66 of the plurality of resilient members 64 are pivotally attached to the forward seat pan 34 of the lower seating structure 12 to allow the cushion suspension system 52 to be raised and lowered, as described below.

As noted above, the seatback 14 is pivotable between an upright position and a fully reclined position and is operably coupled with the lower seating structure 12. The seatback 14 includes a frame 68 having an upper transverse cross member 70, a lower transverse cross member 72, and a pair of opposed lateral seatback frame members 74, 76 vertically extending between the upper and lower transverse cross members 70, 72. Each of the pair of opposed lateral seatback frame members 74, 76 has a seatback pivot mount 78 at a lower portion thereof that is operably coupled with the lower seat pivot mount 50. Preferably, the seatback pivot mounts 78 on each of the pair of opposed lateral seatback frame members 74, 76 comprise a circular recess 80, and the lower seat pivot mount 50 mounted on each of the pair of opposed lateral lower seat frame members 36, 38 comprises a circular projection 82 received within the circular recess 80.

Figure 6:
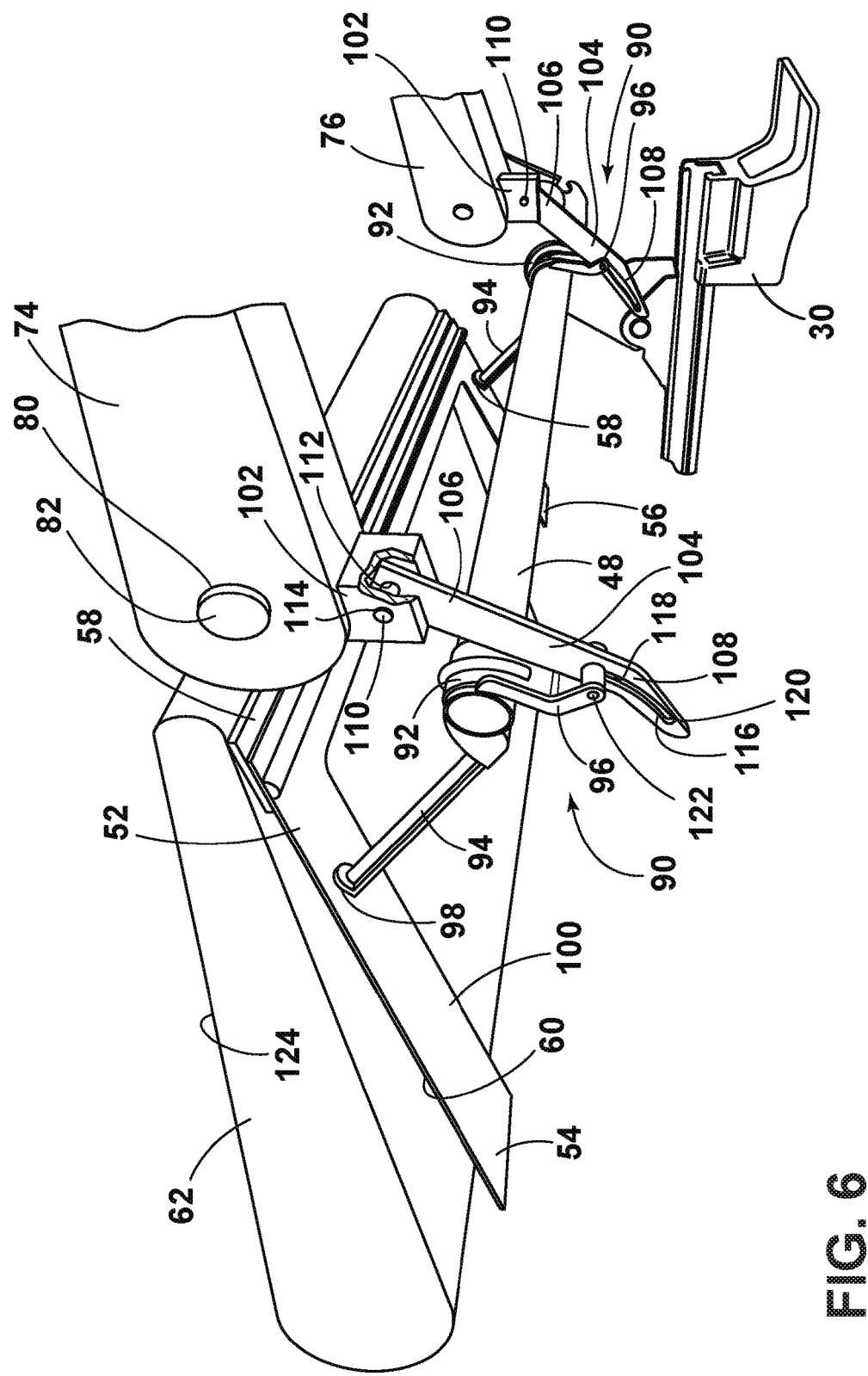
FIG. 6 is a bottom perspective view of the hip lifter mechanism of the automotive seat assembly of FIG. 1, wherein the seatback is in the fully reclined position.
Figures 6A, 6B, 6C, 6D:
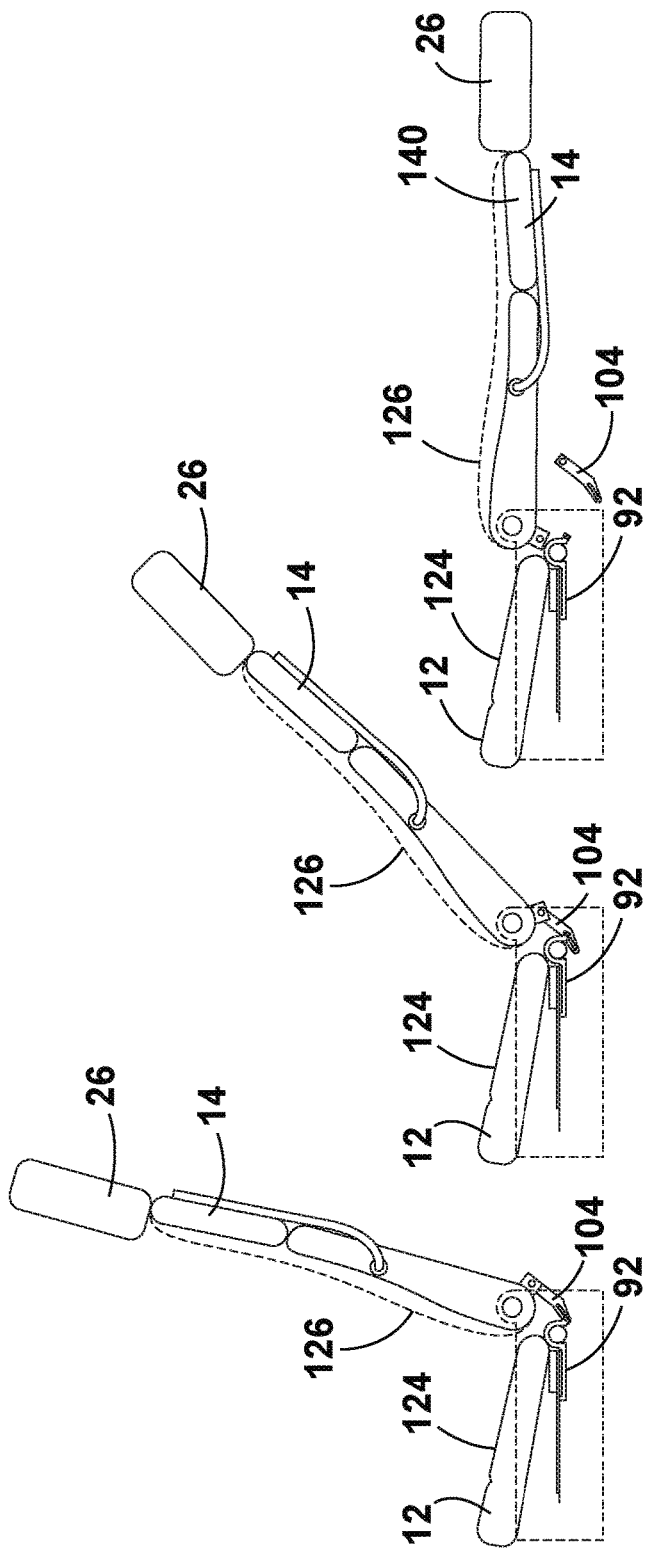
FIG. 6A is a side schematic view of the hip lifter mechanism of the automotive seat assembly of FIG. 1, wherein the seatback is in the upright position.
FIG. 6B is a side schematic view of the hip lifter mechanism of the automotive seat assembly of FIG. 1, wherein the seatback is in the first predetermined position.
FIG. 6C is a side schematic view of the hip lifter mechanism with the link removed and the upper back support in the stowed position of the automotive seat assembly of FIG. 1, wherein the seatback is in the fully reclined position.
FIG. 6D is a schematic side view of the hip lifter mechanism with the link installed and the upper back support in the fully raised position of the automotive seat assembly of FIG. 1, wherein the seatback is in the fully reclined position.

The motor vehicle seating assembly 10 further includes a hip lifter mechanism 90, which comprises a pair of hip lifter pivot brackets 92 operably coupled with and pivotally disposed relative the pivot bar 48. Each of the hip lifter pivot brackets 92 is preferably formed in a U-shape that fits over and is supported by the pivot bar 48 and is similarly fabricated from a lightweight yet strong metallic material. Each of the pair of hip lifter pivot brackets 92 is preferably disposed proximate one of the pair of opposed lateral lower seat frame members 36, 38. As shown in FIGS. 6-6D, each of the hip lifter pivot brackets 92 comprises a forward lever 94 and a rearward lever 96. The forward lever 94 of each of the pair of hip lifter pivot brackets 92 is likewise preferably laterally disposed between the pair of opposed lateral lower seat frame members 36, 38 and beneath one of the pair of lateral opposed suspension frame members 54, 56. So disposed, the forward lever 94 of the hip lifter pivot brackets 92 comprises a glide surface 98 that slidably engages and, upon further rotation, lifts a lower surface 100 of the cushion suspension system 52. It is contemplated that the glide surface 98 may be coated with polytetrofluoride to provide lower friction and reduce wear.

A pair of frame attachment brackets 102 is operably coupled with preferably the lower portions 84 of the opposed lateral seatback frame members 74, 76, as shown in FIGS. 6-6D. Alternatively, the frame attachment brackets 102 may be attached to the lower transverse cross member 72 of the frame 68 of the seatback 14, both preferably by welding. A link 104 is pivotally attached or pinned to each of the frame attachment brackets 102 at a first end 106 and pivotally attached or pinned to the rearward lever 96 of the hip lifter pivot brackets 92 at a second end 108. The pivotable attachment of the first end 106 of the link 104 to the frame attachment bracket 102 is preferably accomplished by a pin 110 secured within an opening 112, 114 in each of the first end 106 of the link 104 and the frame attachment bracket 102, respectively, allowing relative pivotal motion. As shown in FIGS. 6-6D, the link 104 is provided with a slot 116 proximate the second end 108 that is operably coupled with the rearward lever 96 of the hip lifter pivot bracket 92. The slot 116 of the link 104 has an upper end 118 and a lower end 120. The rearward lever 96 of the hip lifter pivot bracket 92 also includes a pin 122 that is received within the slot 116.

In operation, each of the forward levers 94 acts against the lower surface 100 of the cushion suspension system 52. That is, when the seatback 14 is in the upright position, the lower end 120 of the slot 116 is proximate the pin 122 provided in the rearward lever 96, as shown in FIG. 6A. Thus, when the lower end 120 of the slot 116 is proximate with the pin 122, the seatback 14 position corresponds to the upright position of the seatback 14. Similarly, as the seatback 14 is reclined, the upper end 118 of the slot 116 is brought into initial contact with the pin 122 provided in the rearward lever 96, where the seatback 14 position corresponds to a predetermined reclined position between the upright position and the fully reclined position, as shown in FIG. 6B. Preferably, the predetermined reclined position of the seatback 14 is about 55.5° relative a vertical plane. Further rotation of seatback 14 toward the fully reclined position further displaces the rearward lever 96 of the hip lifter pivot bracket 92 downward, which, in turn, rotates the hip lifter pivot bracket 92 and raises the forward lever 94, which then urges upwardly upon the lower surface 100 of the cushion suspension system 52. This action raises the cushion suspension system 52 upwardly upon the seatback pivoting beyond the predetermined reclined position between the upright position and the fully reclined position.

As best shown in FIGS. 3 and 4, each of the lower seating structure 12 and the seatback 14 have an exposed surface 124, 126, respectively. Preferably, the exposed surface 124 comprises a locally flexible/stretch trim material relative to the cushion foam and trim assembly 62 that may be moved in order to keep the trim material and foam of the cushion foam and trim assembly 62 in tension to maintain a flat surface and eliminate wrinkling. In particular, a rear edge 128 of the cushion foam and trim assembly 62 of the lower seating structure 12 is raised by moving the seatback 14 to the fully reclined position, such that the cushion suspension system 52 raises the exposed surface 124 of the seat cushion foam and trim assembly 62 to substantially occupy the same horizontal plane as that of the exposed surface 126 of the seatback 14 when the seatback 14 is in a fully reclined position. This benefit might be most appreciated by comparing the relative exposed surfaces 124, 126 in FIG. 6C, where the link 104 has been removed and the hip lifter mechanism 90 thus disabled, with the relative exposed surfaces 124, 126 shown in FIG. 6D, where the link 104 is installed and the exposed surfaces 124, 126 occupy substantially the same plane.

Figure 9:
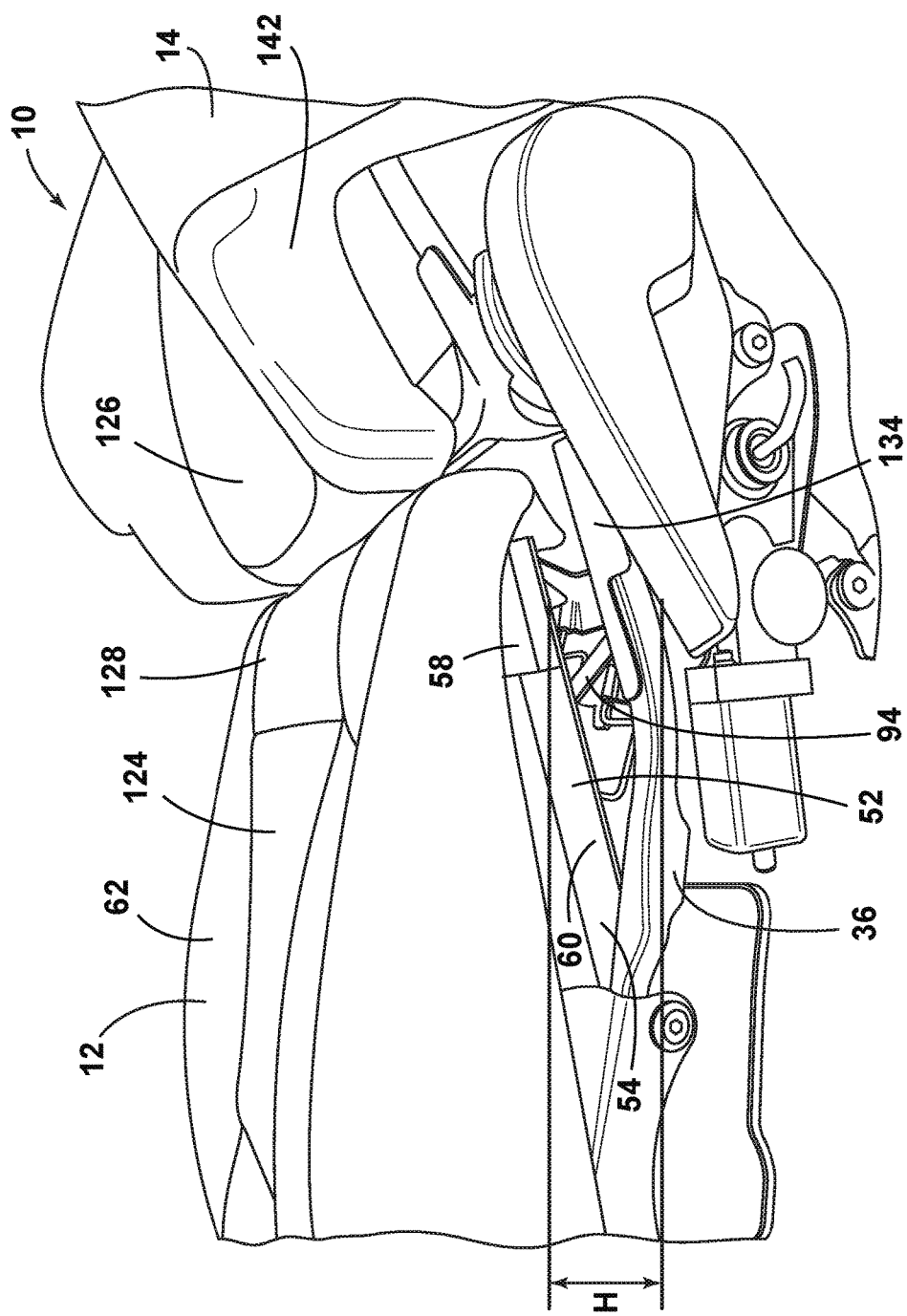
FIG. 9 side perspective view of seating assembly of the automotive seat assembly of FIG. 1.

Preferably, the hip lifter mechanism 90 raises the cushion suspension system 52 and cushion foam and trim assembly 62 a distance H between 45 to 70 mm between the upright position and the fully reclined position of the seatback 14 to eliminate pressure on the lumbar and lifting the occupant's tailbone and hips, as shown in FIG. 9. The result is a substantially planar and continuous surface from the exposed surfaces 124, 126 of the cushion foam and trim assembly 62 and seatback 14, respectively. Preferably, the fully reclined position of the seatback 14 is reached at about 85° from vertical, extending from a front edge 130 of the lower seating structure 12 to an upper portion 132 of the seatback 14.

In addition, the slotted linkage for the hip lifter mechanism 90 provides a passive system that automatically raises the height of the lower seating structure cushion foam and trim assembly 62 once the seatback 14 reaches a desired sleeper initiation angle, here preferably 55.5° from vertical, and achieves maximum lift of the cushion foam and trim assembly 62 once the seatback 14 reaches the maximum sleeper angle, here preferably 85° from vertical. Additional benefits of the hip lifter mechanism 90 disclosed herein is that the forward levers 94 are disposed between the cushion suspension system 52 and the lower seat frame side members 36, 38 so as not to affect the seating assembly H-point or comfort when the seatback 14 of the seating assembly 10 is not in the fully reclined position or sleeper mode. Further, the maximum lift height of the rear edge 128 of the cushion foam and trim assembly 62 of the lower seating structure 12 can be readily modified and tuned to specific applications by relatively simple changes to the system geometry, such as the shape and length of the slot 116.

Further, the hip lifter mechanism 90 represents a relatively simple mechanical system which can be manually actuated and does not require a motor, although a power actuated vehicle seating assembly can likewise beneficially employ the disclosed hip lifter mechanism 90. In addition, existing seatback 14 recline latch controls 134 and associated mechanism can be readily employed to maintain the seatback 14 in the desired reclined position between the upright position and the fully reclined position, while simultaneously providing the lift function for the rear edge 128 of the lower seating structure cushion foam and trim assembly 62 beyond a predetermined reclined position. Finally, the disclosed hip lifter mechanism 90 is readily adaptable as a retrofit device to existing motor vehicle seating assemblies 10.

Thus, to the extent that a motor vehicle occupant desires a supine position to rest when the motor vehicle 6 is not in operation, the aforementioned disclosure provides just such a platform upon which the motor vehicle occupant may rest. In accordance with the aforementioned disclosure, it is now possible to provide a more comfortable sleeping seat surface by raising the height of the rear edge 128 of the cushion foam and trim assembly 62 of the lower seating structure 12 to make the overall surface more level and the transition from the cushion foam and trim assembly 62 to the seatback 14 less noticeable.

Also, additional features can be added to the motor vehicle seating assembly 10 to provide an overall surface that is more level. In particular, the motor vehicle seating assembly 10 described above can further include an upper back support 140 that can be raised above a main body 142 of the seatback 14 within a range of a plurality of positions, between a stowed position and a fully raised position, where a moveable cushion 144 is attached to and disposed above the upper back support 140 to form an exposed surface 162.

Figure 12:
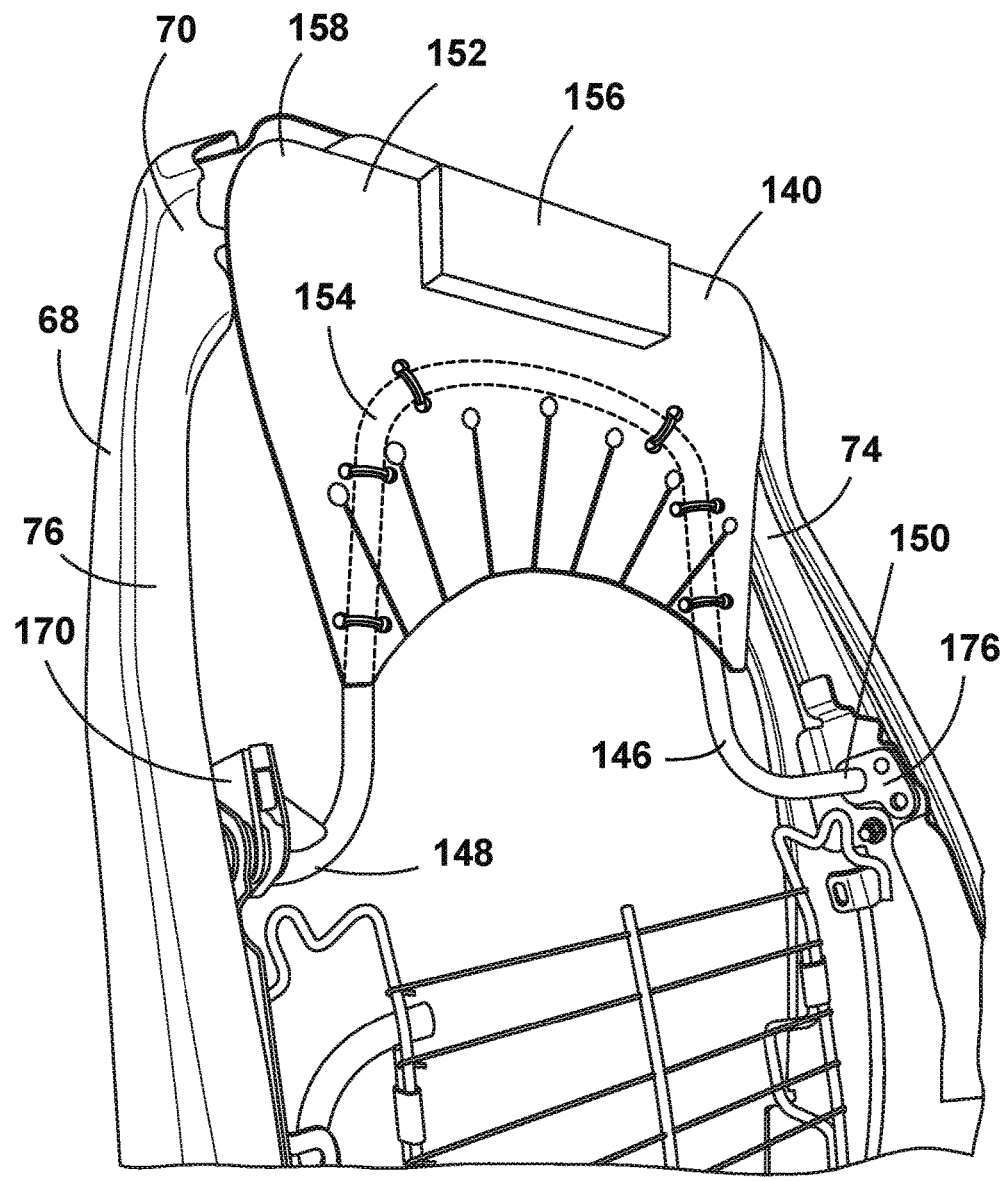
FIG. 12 is a front perspective view of the tubular member and substantially rigid planar base of the upper back support of the automotive seat assembly of FIG. 1 with the upper back support in the stowed position.
Figure 13:
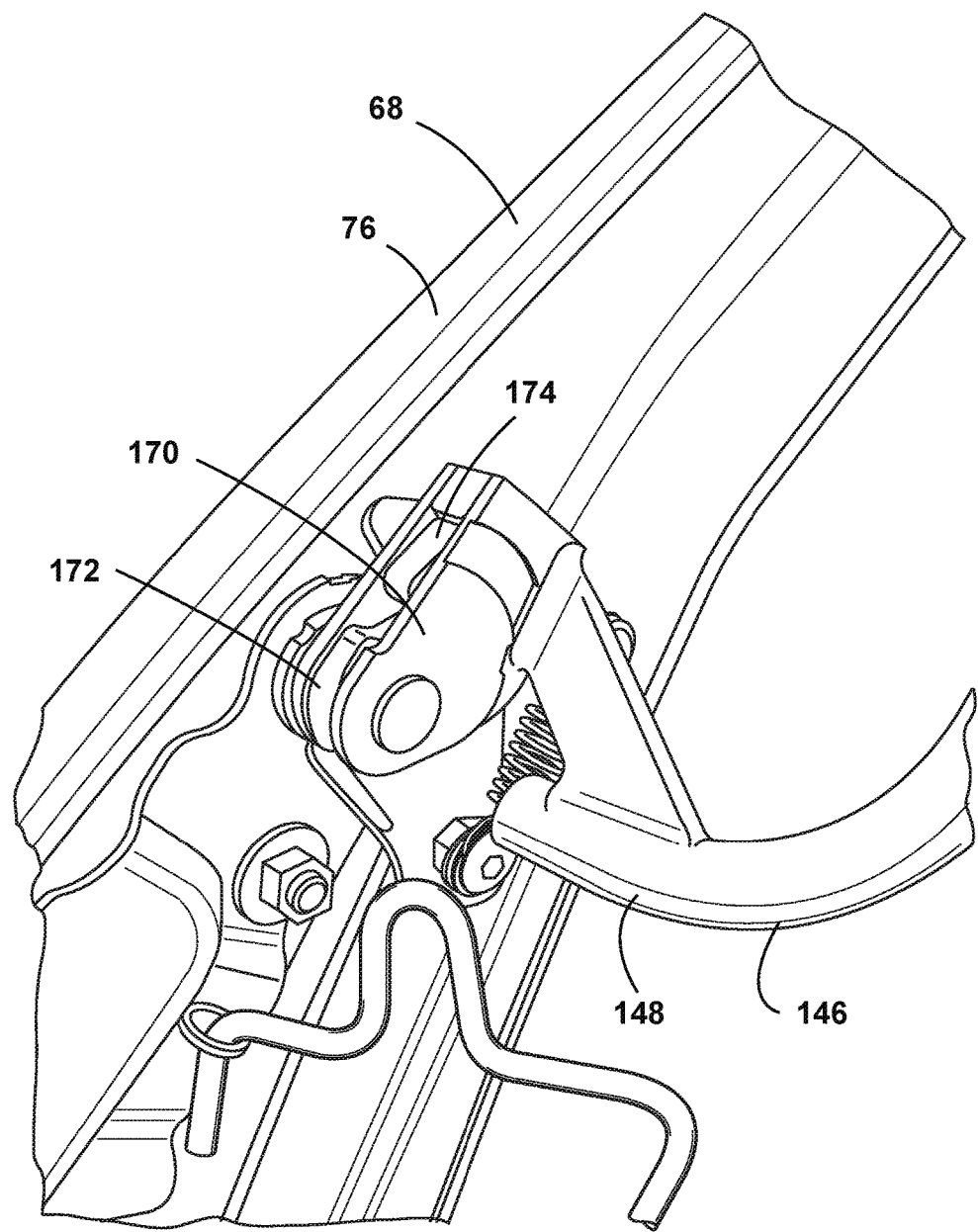
FIG. 13 is a side perspective view of the ratchet latch of the upper back support of the automotive seat assembly of FIG. 1 with the upper back support in the stowed position.
Figure 14:
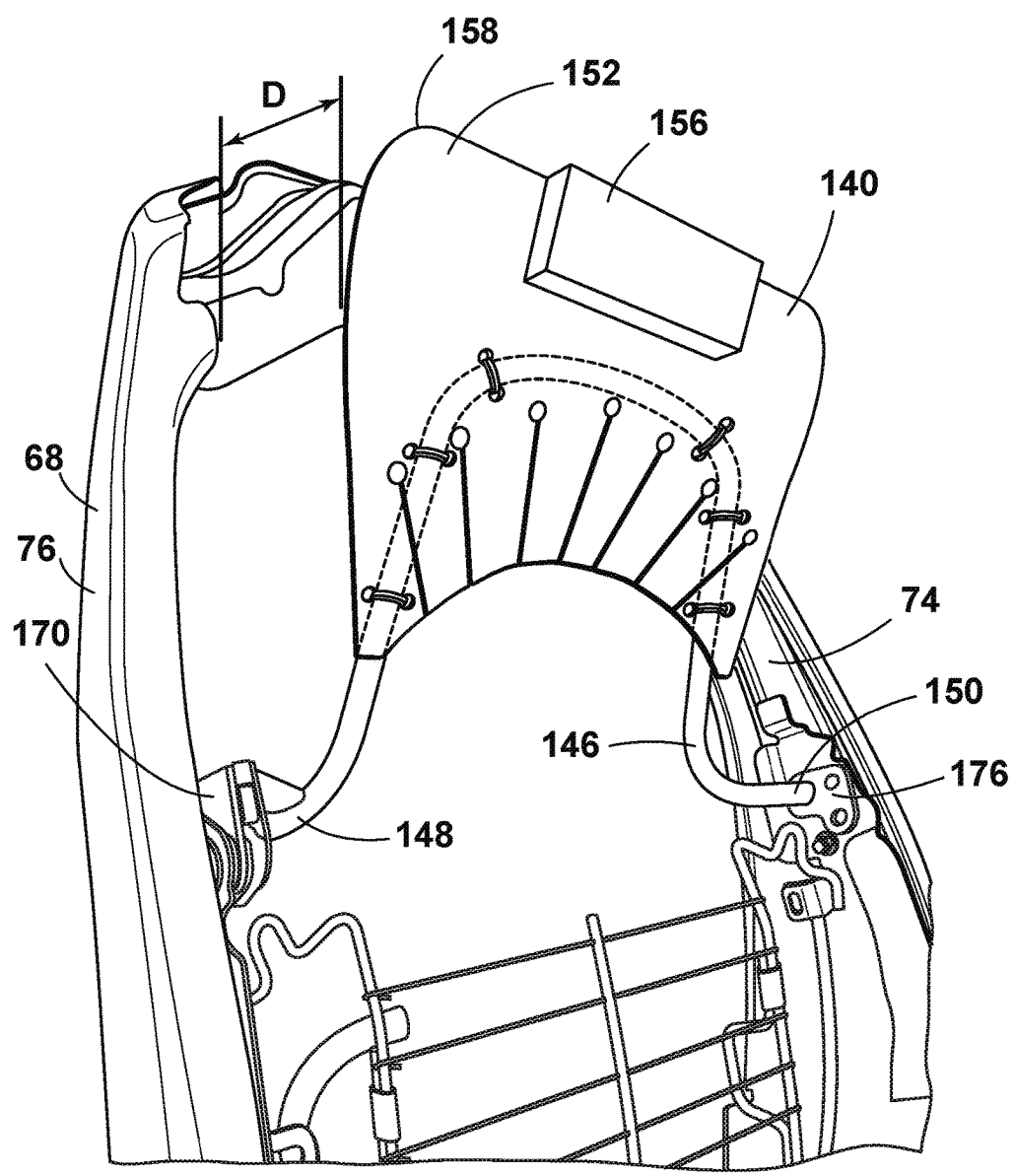
FIG. 14 is a front perspective view of the tubular member and substantially rigid planar base of the upper back support of the automotive seat assembly of FIG. 1 with the upper back support in the fully raised position.
Figure 15:
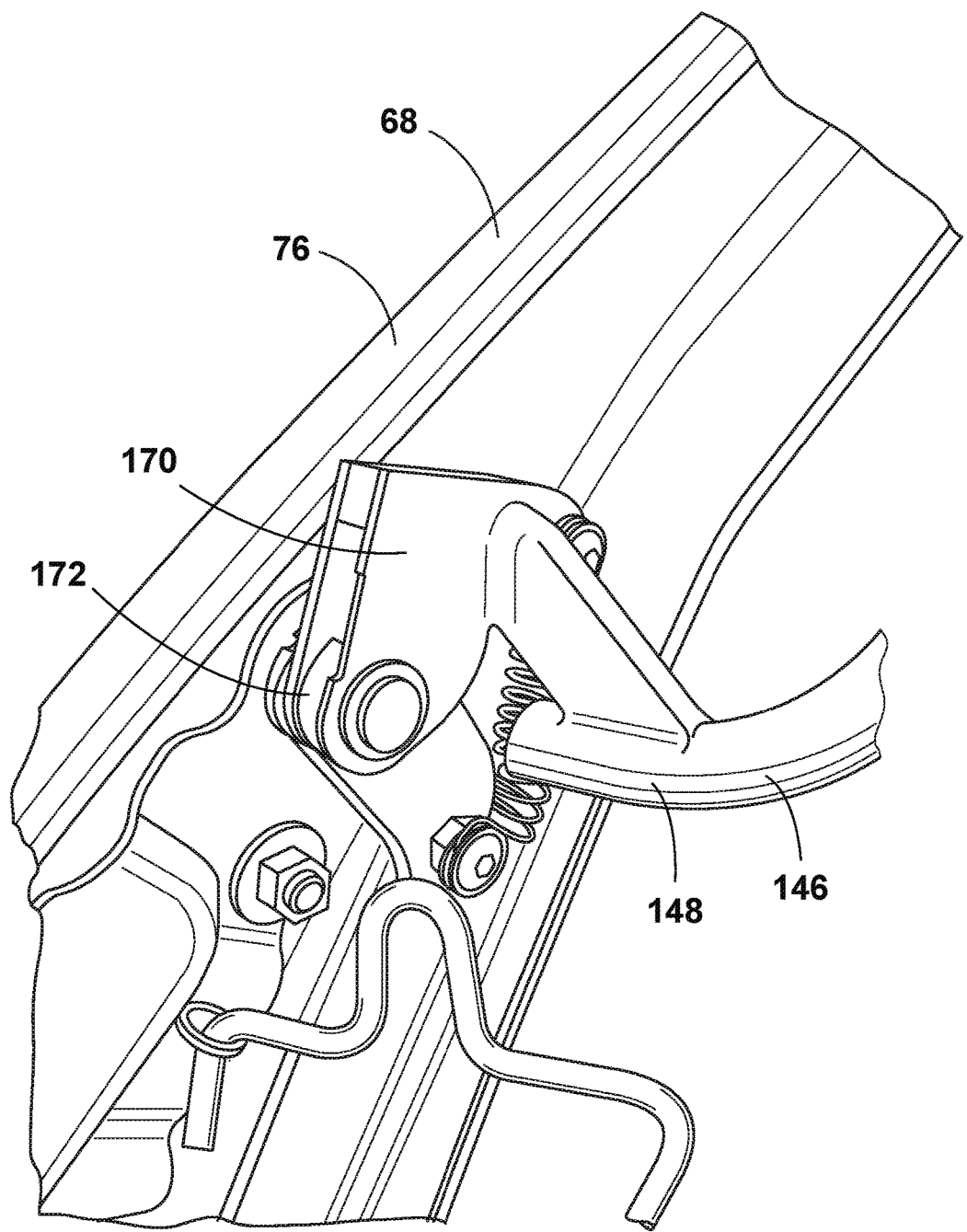
FIG. 15 is a side perspective view of the ratchet latch of the upper back support of the automotive seat assembly of FIG. 1 with the upper back support in the fully raised position.

The upper back support 140 preferably includes a tubular member 146 pivotally attached at a first end 148 to one of the pair of opposed lateral seatback frame members 74, 76 and pivotally attached at a second end 150 to the other of the pair of opposed lateral seatback frame members 74, 76. A substantially rigid planar base 152 is attached to a central portion 154 of the tubular member 146, as shown in FIGS. 12 and 14. The central portion 154 of the tubular member 146 preferably forms a substantially U-shaped and upwardly extending configuration within a plane of the seatback 14 when in the stowed position, as shown in FIG. 12. The substantially rigid planar base 152 is preferably attached to the central portion 154 of the tubular member 146 by fasteners arranged in regular intervals, as shown in FIGS. 12 and 14. Preferably, the substantially rigid planar base 152 is shaped in a "paddle"-like configuration and further comprises a raised support 156 proximate an upper edge 158 of the substantially rigid planar base 152 and disposed beneath the movable cushion 144. The substantially rigid planar base 152 of the upper back support 140 is preferably fabricated from a resilient plastic material, such as polypropylene, that provides sufficient support. The raised support 156 may be fabricated from foam padding or some other resilient material and is provided to ensure the desired height profile, as described herein.

The movable cushion 144 disposed above the upper back support 140 forms a movable exposed surface 162, which may be similarly fabricated as a trim 164 and foam pad 166 assembly to provide a finished look, where the trim 164 is fabricated locally with a resilient, stretchable, or flexible fabric material that allows the upper back support 140 to readily move relative the seatback 14. The use of a resilient trim material 164 disposed about the foam pad 166 further maintains a flat surface and eliminates wrinkling between the stowed position and the fully raised position.

Preferably, a ratchet latch 170 pivotally couples the first end 148 of the tubular member 146 to the inboard lateral frame member 74. The ratchet latch 170 comprises a ratchet gear 172 and ratchet pawl 174 operably coupled with the ratchet gear 172. The second end 150 of the tubular member 146 is pivotally attached to the other lateral seatback frame member 74 by a simple pivot 176. The ratchet latch 170 operably couples the first end 148 of the tubular member 146 to the lateral seatback frame member 76 to restrain the tubular member 146 in one of a plurality of positions between the stowed position and the fully raised position. Preferably, displacement of the upper back support 140 beyond the fully raised position actuates the ratchet pawl 174 to an over-travel condition to return the ratchet latch 170 and the upper back support 140 to the stowed position. That is, when the upper back support 140 is rotated beyond the last latch position corresponding to the fully raised position, the upper back support 140 is returned to its design position by articulating full-forward and employing a spring to pull the upper back support 140 back to its design and fully stowed position.

Preferably, as shown in FIGS. 10-12 and 14, the upper back support 140 is disposed centrally between a first and second lateral edge 180, 182 of the seatback 14 and below the head restraint 26. Thus disposed, the upper back support 140 is designed to provide support between the shoulder blades of the motor vehicle occupant by use of a tubular member 146 to reduce muscle stress and increase neck blood flow. Similarly, as shown in FIGS. 3 and 4, the seatback 14 further includes the head restraint 26, which itself forms an exposed surface 178. As noted above, the movable cushion disposed above the upper back support 140 forms the movable exposed surface 162. With the upper back support 140 in the fully raised position, the exposed surfaces 162, 178 of the upper back support 140 and head restraint 26, respectively, form a substantially planar surface, as seen in FIG. 4.

The upper back support 140 is preferably controlled manually by pulling the upper back support 140 forward relative the seatback 14. In one embodiment, the upper back support 140 is moved from the stowed position to one of the plurality of positions by simply grasping the movable cushion 144 of the upper back support 140 and manually pulling the upper back support 140 forward to its desired raised position. Alternatively, the upper back support 140 may also include a pull strap 184 by which the upper back support 140 is pulled forward relative the seatback 14.

Figure 11:
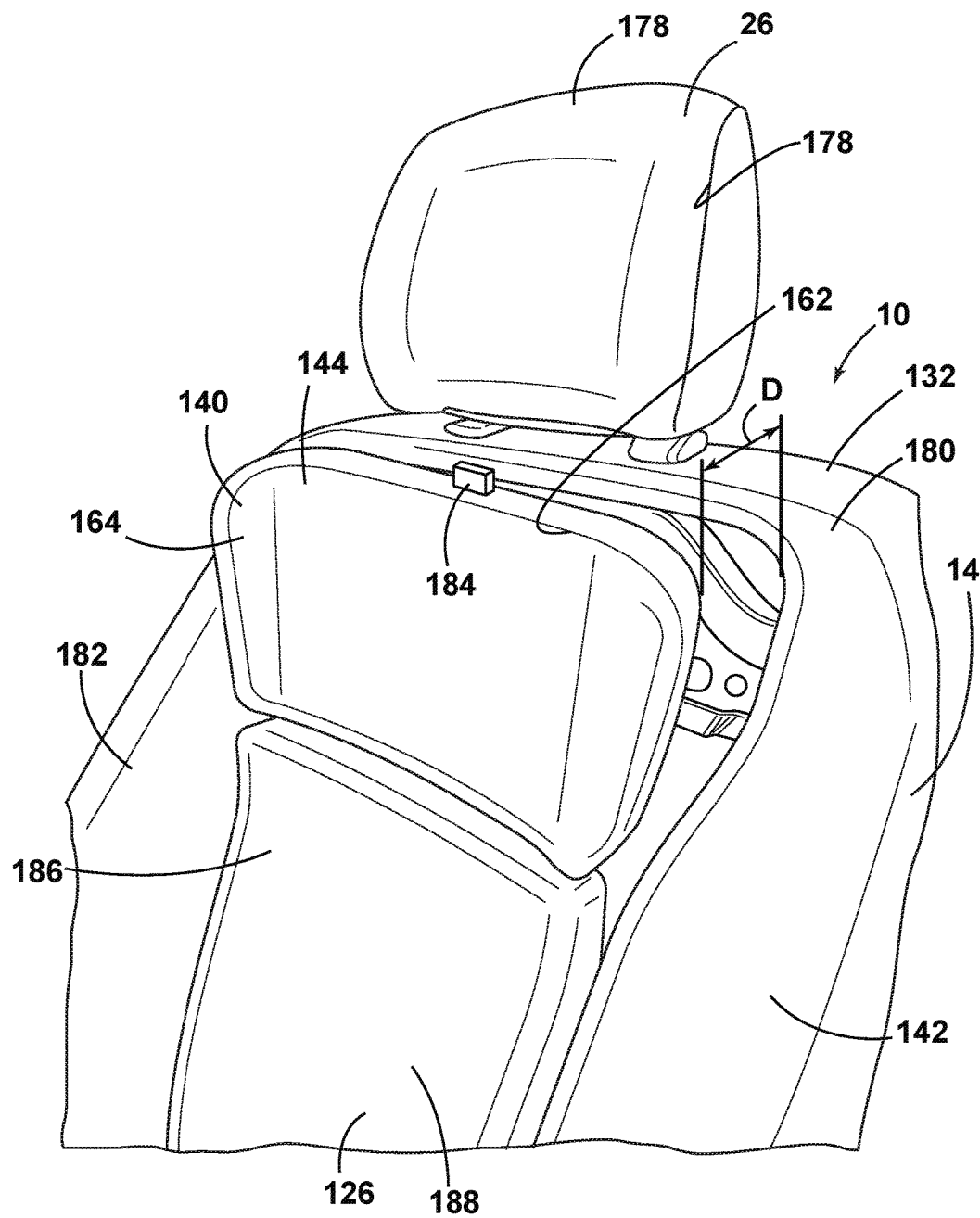
FIG. 11 is a front perspective view of the automotive seat assembly of FIG. 1 with the upper back support in the fully raised position.

In its stowed position, the upper back support 140 is preferably about 0° relative the plane of the seatback 14. Conversely, in the fully raised position, the upper back support 140 is preferably about 15° relative the plane of the seatback 14 the distance D between 7 and 10 cm, as shown in FIGS. 11 and 14. The ratchet latch 170, described above, provides a plurality of positions of the upper back support 140, and preferably provides a discrete position in intervals of 1.5° between the stowed position and the fully raised position.

Thus, as noted above and as further described herein, the exposed surface 178 of the head restraint 26 and the movable exposed surface 162 of the upper back support 140 is capable of forming a substantially continuous plane when the upper back support surface is in the raised position. The upper back support 140 accordingly provides many of the desirable features noted above relative the hip lifter mechanism 90.

Figure 10:
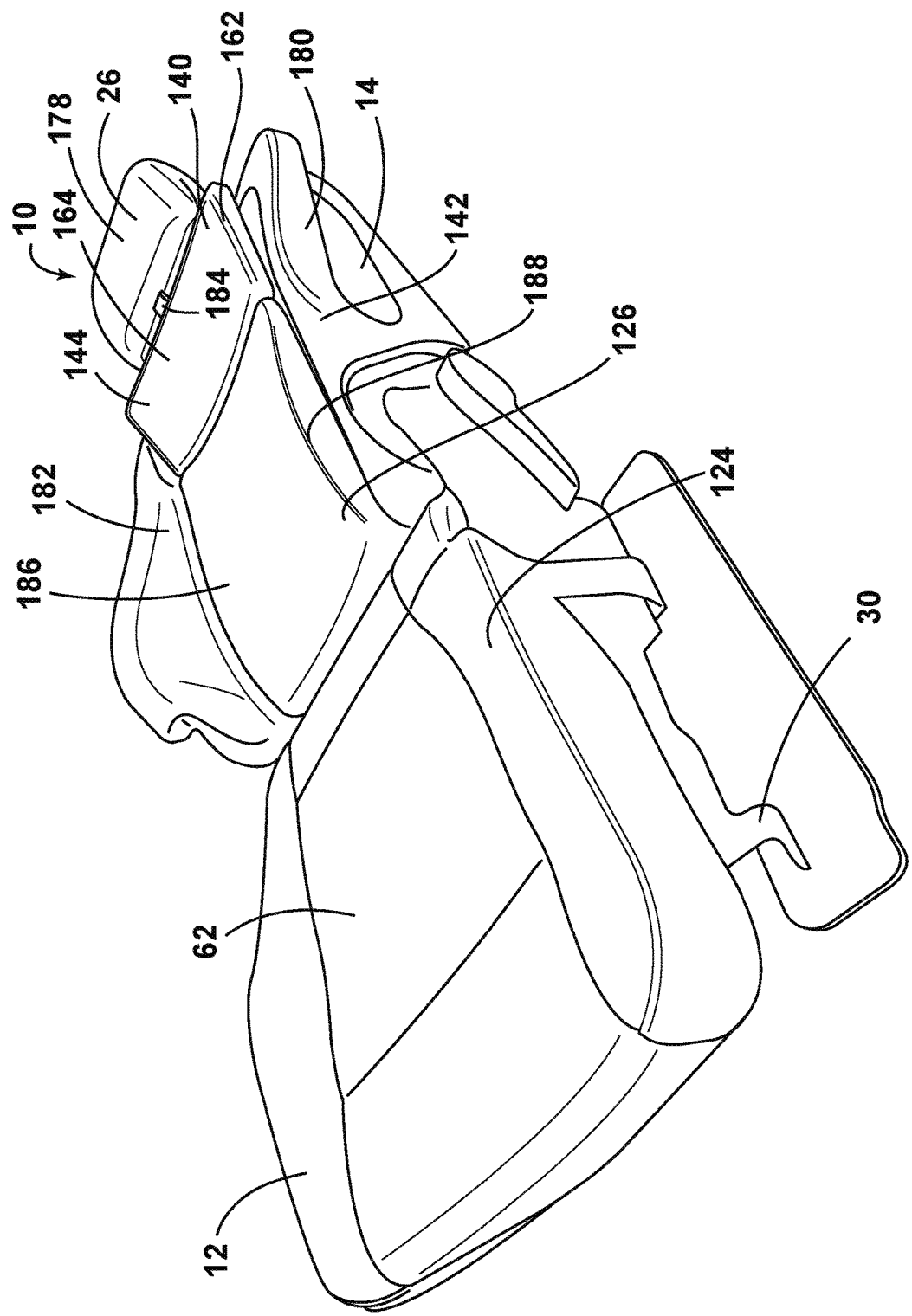
FIG. 10 is a front perspective view of the automotive seat assembly of FIG. 1 with the upper back support in the fully raised position.

In addition, a lower back support 186 may be disposed below the upper back support 140, and the lower back support 186 may be operatively coupled with the upper back support 140. Thus, when the upper back support 140 is raised from its stowed position, the lower back support 186 may be also raised relative a plane of the seatback 14 to provide a smooth and level transition between an exposed surface 188 of the lower back support 186 and the exposed surface 162 of the upper back support 140, as shown in FIG. 10.

Figure 16:
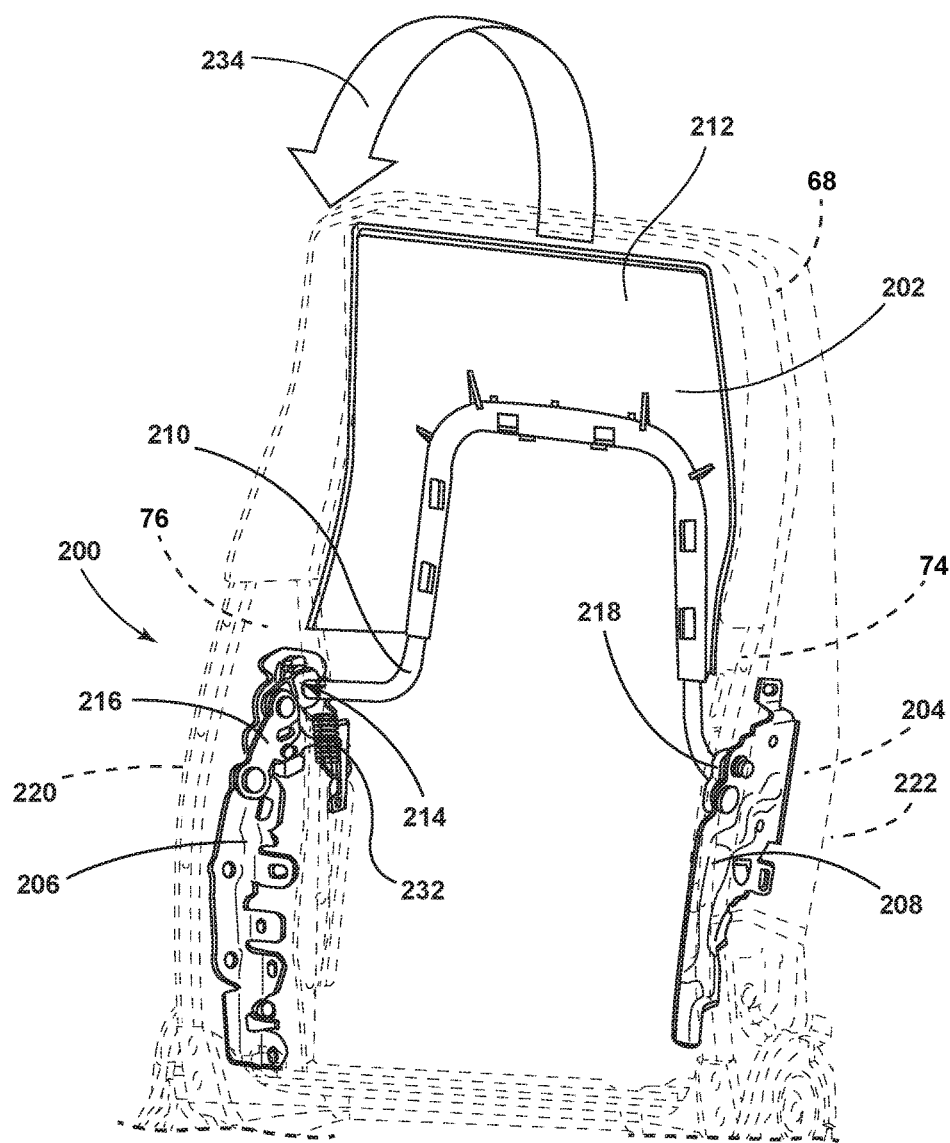
FIG. 16 is a side perspective view of a mounting assembly for attaching an upper back support to a vehicle seatback frame with the upper back support in the stowed position.

Referring to FIG. 16, a mounting assembly 200 for attaching a pivotable upper back support 202 to a vehicle seatback frame 204 is shown. The mounting assembly 200 for attaching a pivotable upper back support 202 to a vehicle seatback frame 204 includes a first bracket 206 and a second bracket 208. In various aspects, the first bracket 206 and the second bracket 208 may be coupled to opposed lateral seatback frame members 220, 222. A tubular member 210 is located between the first bracket 206 and the second bracket 208. A paddle member 212 is attached to the tubular member 210. In the depicted aspect, the tubular member 210 is U-shaped, and the paddle member 212 is a thermoplastic material. A ratchet latch 214 is coupled to the first bracket 206 with a ratchet mounting bracket 216.

Figure 18:
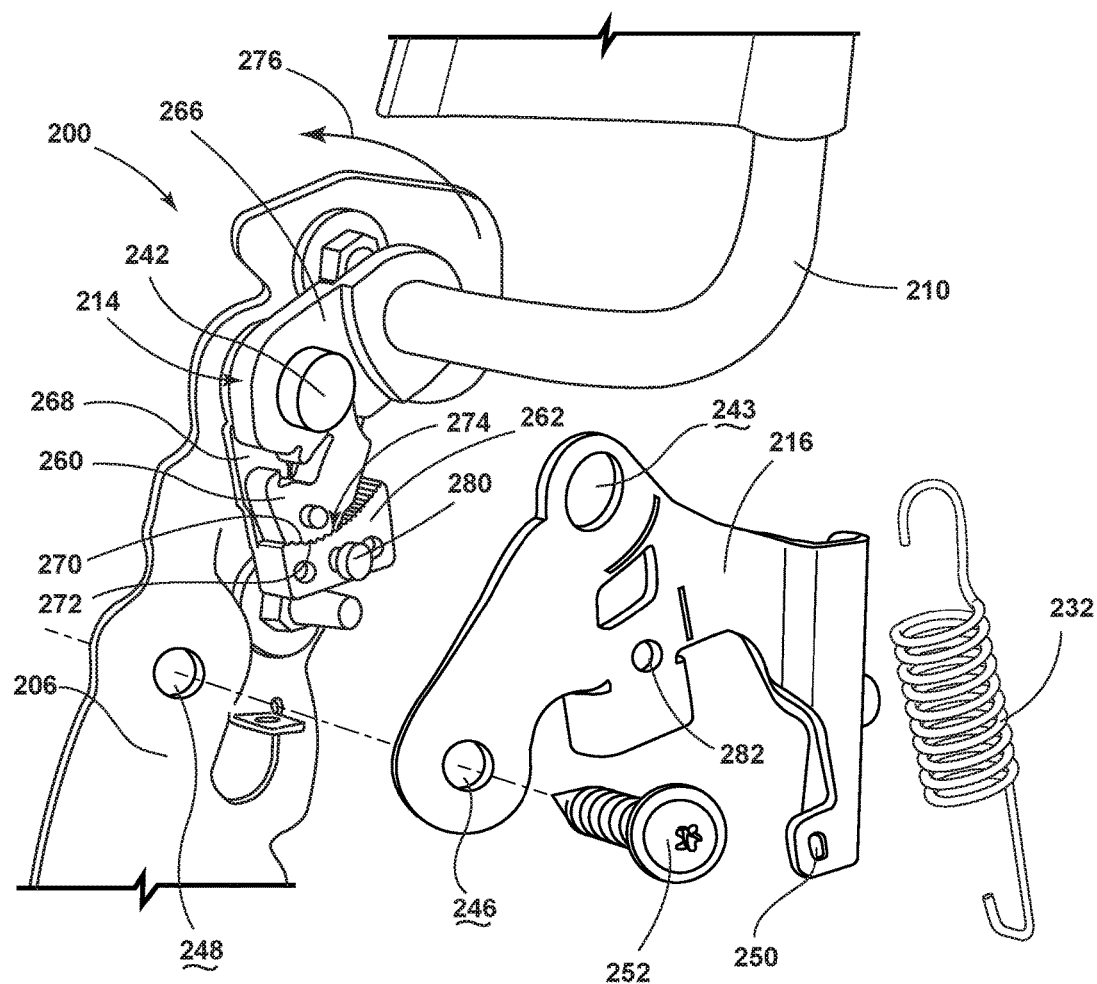
FIG. 18 is an exploded side perspective view of the first alternate aspect of the ratchet latch of the upper back support of the automotive seat assembly of FIG. 16 with the upper back support in the stowed position.

Referring to FIG. 18, the ratchet mounting bracket 216 retains the drive gear 260 and the stationary gear 262 in an engaged position between the ratchet mounting plate 268 and the ratchet mounting bracket 216.

Figure 17:
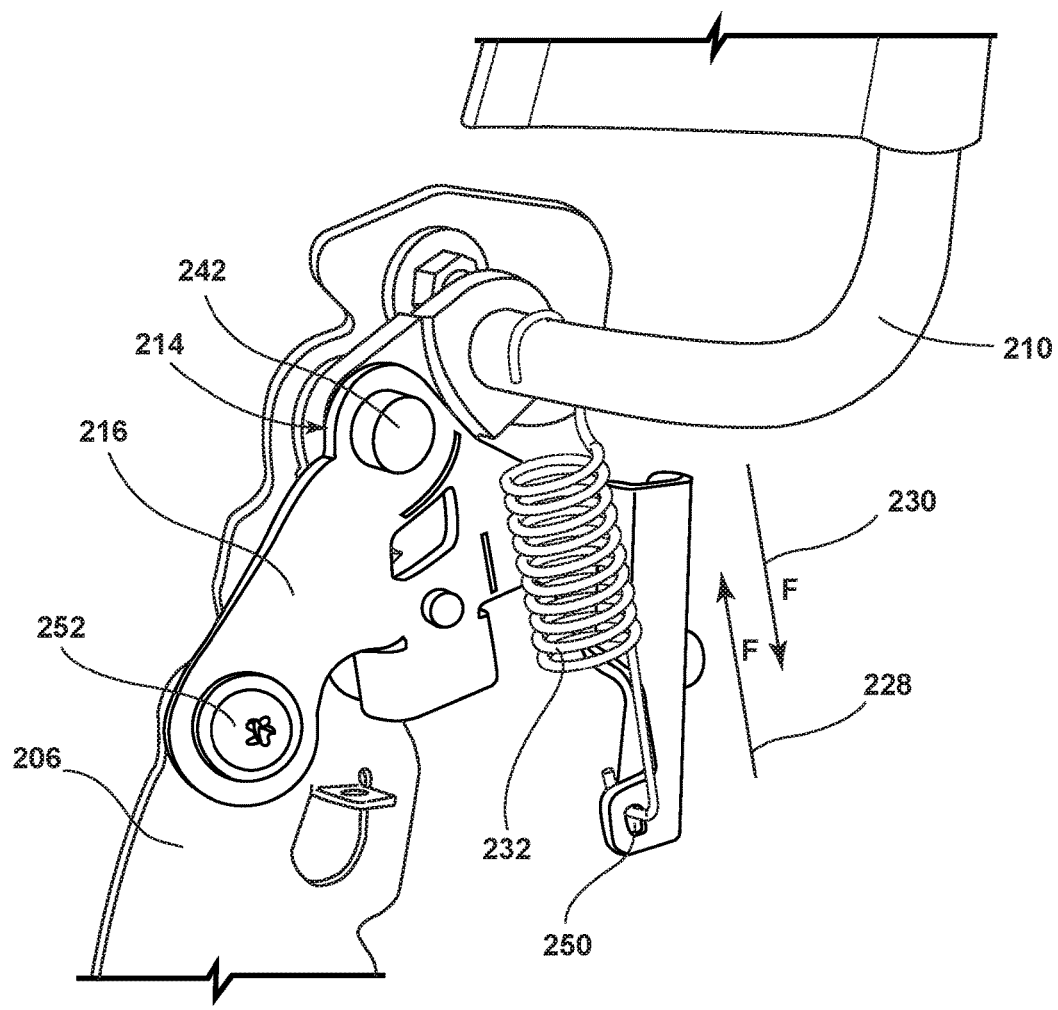
FIG. 17 is a side perspective view of a first alternate aspect of the ratchet latch of the upper back support of the automotive seat assembly of FIG. 16 with the upper back support in the stowed position.

Referring again to FIG. 16, a bushing 218 is coupled to the second bracket 208. In the depicted aspect, the tubular member 210 is pivotally coupled to the ratchet latch 214 and the bushing 218. With reference to FIG. 16, in various aspects of the disclosure, when the mounting assembly 200 is attached to opposed lateral seatback frame members 220, 222, the ratchet latch 214 is selectively positionable in a plurality of predetermined intermittent positions to arrange the upper back support 202 between the stowed position and the fully raised position, as exemplarily shown with regard to upper back support 140 in FIGS. 6C and 6D. Referring to FIGS. 16-17, a force depicted by arrow 228 is exerted on extension spring 232 when the upper back support 202 is moved from a stowed to a fully raised position in the direction shown by arrow 234 of FIG. 16. The force depicted by arrow 230 retracts the extension spring 232 of the upper back support 202 from beyond the fully raised position (overtravel position or beyond a fully deployed position) to the stowed position when the upper back support 202 is beyond the fully raised position (overtravel position or beyond a fully deployed position).

Referring again to FIG. 16, the arrow 234 depicts the direction of rotation of the tubular member 210 and the paddle member 212 from the stowed position to the fully raised position.

Figure 20:
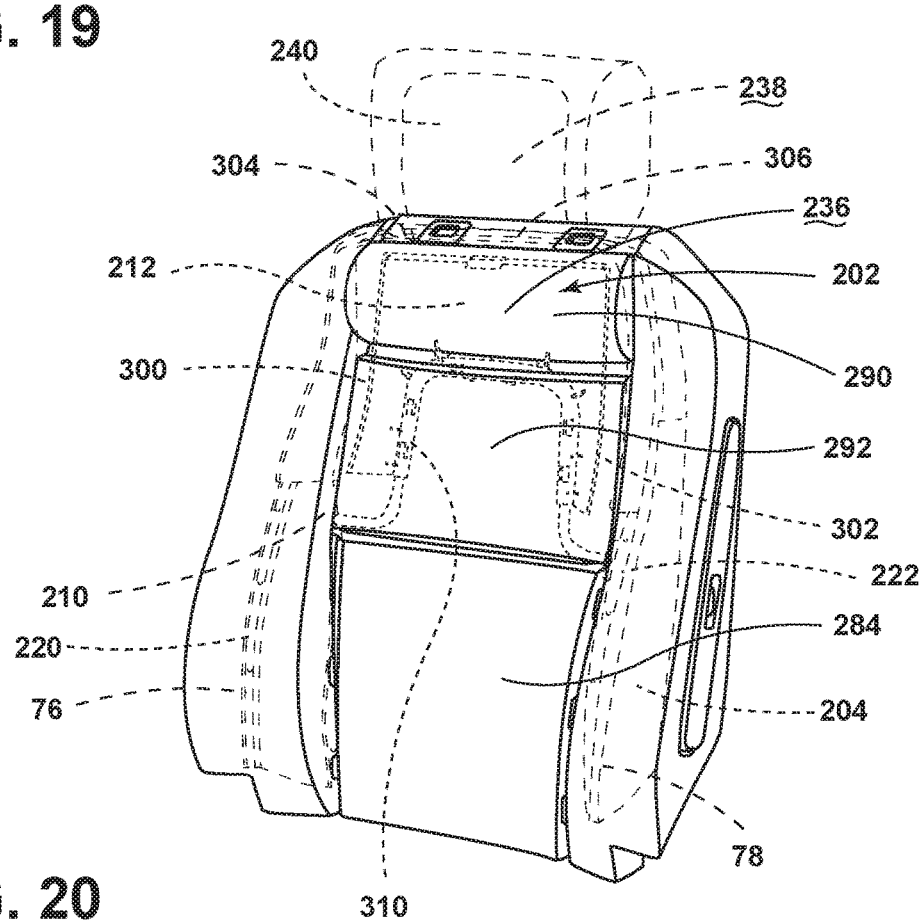
FIG. 20 is a side perspective view of a seatback including the tubular member and the paddle member.

With reference to FIG. 20, the fully raised position typically provides alignment of the exposed top surface 236 of the upper back support 202 with a top surface 238 of a head restraint 240, as exemplarily shown in FIGS. 3A, 4, 6C, and 6D with regard to upper back support 140 upper portion 132 and head restraint 26 exposed surface 178. In its stowed position, the upper back support 202 is typically about 0° relative to the plane of the seatback 284. In the fully raised position, the upper back support 202 is typically about 15° relative to the plane of the seatback 284.

Referring to FIGS. 16-18, the ratchet latch 214 provides a plurality of positions of the upper back support 202, and typically provides a discrete position in intervals of 1.5° between the stowed position and the fully raised position.

Referring to FIG. 18, the drive gear 260 and the stationary gear 262 are selectively engageable to place the tubular member 210 in one of a plurality of predetermined positions.

Referring to FIG. 17, the ratchet drive pin 242 and the fastener 252 secure the ratchet mounting bracket 216 to the first bracket 206. The ratchet mounting bracket 216 holds the ratchet latch 214 to the first bracket 206. An extension spring 232 is coupled to the tubular member 210 and an aperture 250 in the ratchet mounting bracket 216.

FIG. 18 shows the ratchet latch 214 of FIG. 17 with the extension spring 232, the ratchet mounting bracket 216, and the fastener 252 removed from the mounting assembly 200. The ratchet latch 214 includes the drive gear 260 and the stationary gear 262. A ratchet backing plate 268 is retained by a ratchet drive pin 242 and held to the first bracket 206. The ratchet backing plate 268 includes the stationary gear 262. When tubular member 210 is moved from the stowed position to the deployed position in the direction depicted by arrow 234 of FIG. 16, the drive bracket 266 rotates about the ratchet drive pin 242 to move the drive gear 260 in relation to the stationary gear 262. A toothed portion 270 of drive gear 260 and a toothed portion 272 of the stationary gear 262 form a toothed interface 274. The toothed interface 274 may be formed when a first toothed portion (toothed portion 270 of the drive gear 260) and a second toothed portion (toothed portion 272 of stationary gear 262) become enmeshed. The toothed interface 274 between the drive gear 260 and the stationary gear 262 allows for positioning the tubular member 210 in a plurality of positions between the stowed position and the fully deployed position. When the tubular member 210 is rotated in the direction depicted by the arrow 234 in FIG. 16, then a force depicted by arrow 228 is applied to the extension spring 232, the extension spring 232 becomes elongated, and the drive bracket 266 rotates around the ratchet drive pin 242 in the direction depicted by arrow 276. When the tubular member 210 is moved beyond the fully deployed position, the drive gear 260 and the stationary gear 262 separate at the toothed interface 274 due to the force depicted by arrow 230 exerted by the return of the extension spring 232 to a non-extended position. Referring again to FIGS. 17-18, the stationary gear 262 includes a lock pin 280. The lock pin 280 protrudes through the hole 282 in the ratchet mounting bracket 216. The lock pin 280 and the ratchet drive pin 242 retain the ratchet mounting bracket 216 to the ratchet backing plate 268 and the stationary gear 262 and keep the stationary gear 262 in a fixed position while the drive bracket 266 moves the drive gear 260 in relation to the stationary gear 262.

Figure 19:
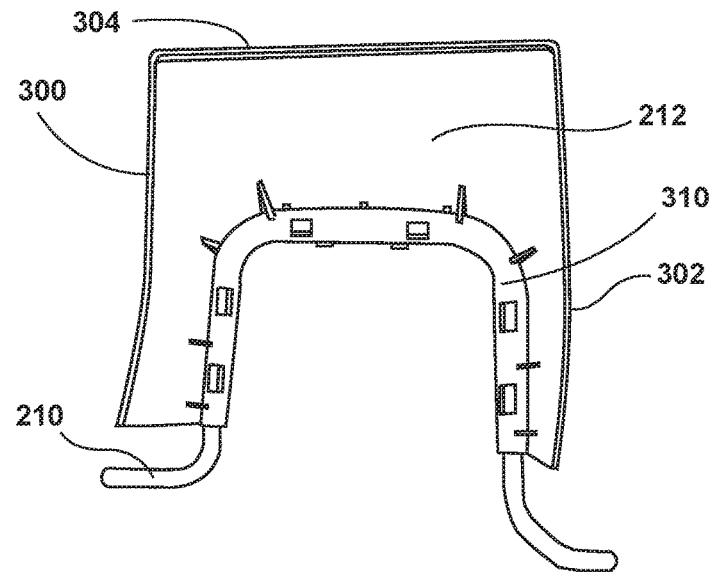
FIG. 19 is a perspective view of the tubular member and the paddle member.

Referring to FIGS. 19-20, the tubular member 210 is shown with an over-molded paddle member 212. The paddle member 212 includes a first edge 300 proximate a first lateral member 220 of the seatback 284, a second edge 302 proximate a second lateral member 222 of the seatback 284, and a top edge 304 proximate an upper transverse cross member 306 of the seatback 284. In the depicted aspect, a thermoplastic material forms the paddle member 212 and is molded around an upper portion 310 of the tubular member 210 to the first edge 300, the second edge 302, and the top edge 304. In various aspects, the first upholstered portion 290 and the second upholstered portion 292 are attached to the tubular member 210 and the paddle member 212. A tab may be manually pulled to move the upper support member 202 from the stowed position to the deployed position.

Figure 21:
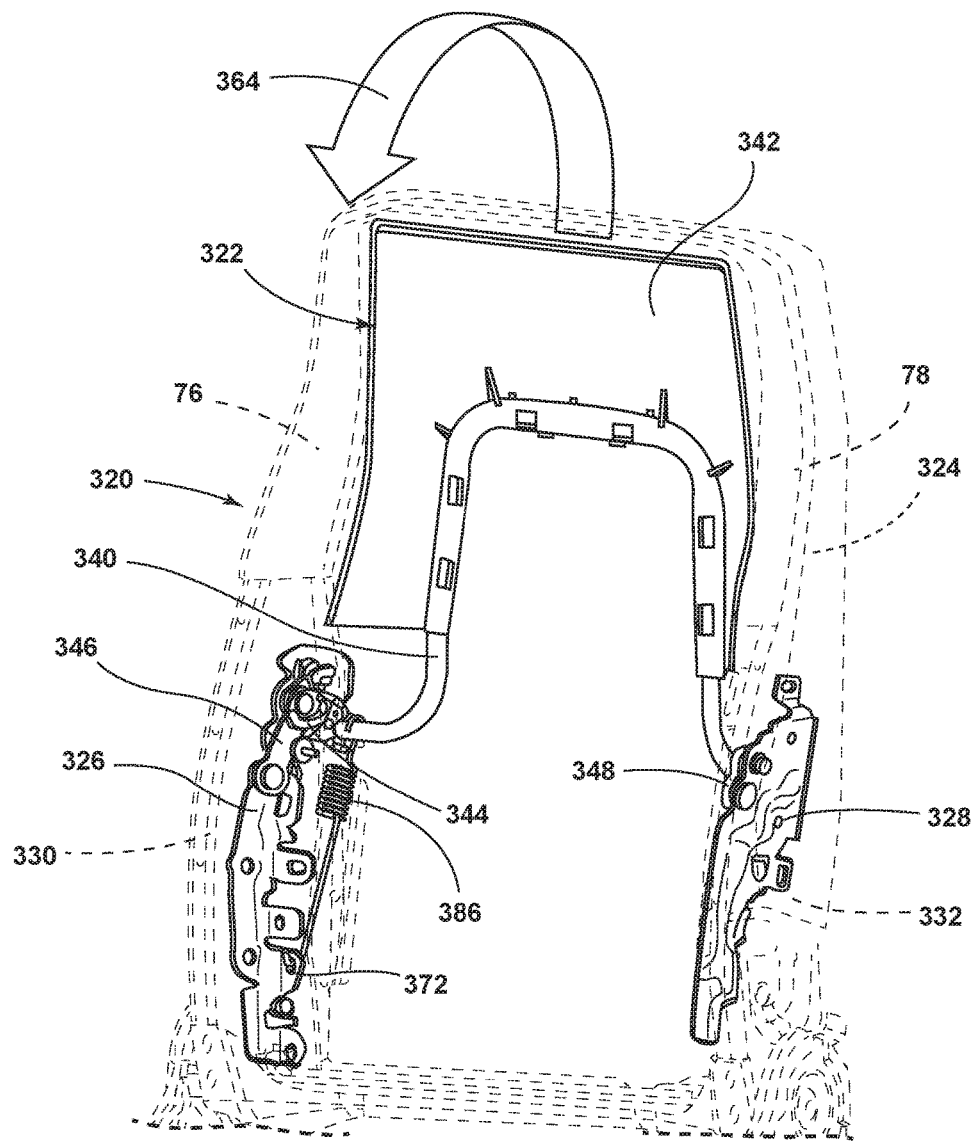
FIG. 21 is a side perspective view of an alternate aspect of a mounting assembly for attaching an upper back support to a vehicle seatback frame.
Figure 22:
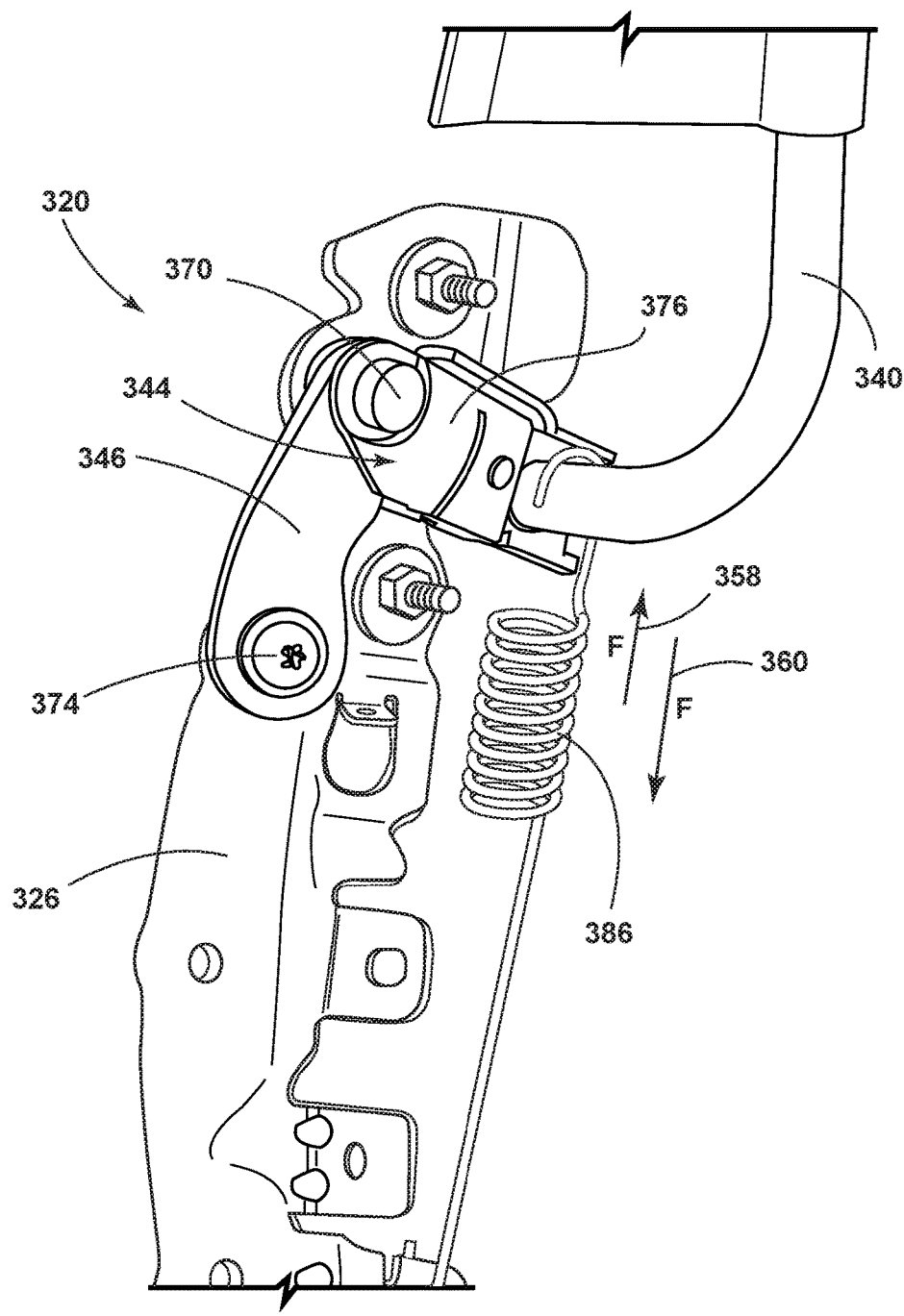
FIG. 22 is a side perspective view of a second alternate aspect of the ratchet latch of the upper back support of the automotive seat assembly of FIG. 21 with the upper back support in the stowed position.

Referring to FIG. 21, an alternate aspect of a mounting assembly 320 for attaching a pivotable upper back support 322 to a vehicle seatback frame 324 is shown. The mounting assembly 320 for attaching a pivotable upper back support 322 to a vehicle seatback frame 324 includes a first bracket 326 and a second bracket 328. In various aspects, the first bracket 326 and the second bracket 328 may be coupled to opposed lateral seatback frame members 330, 332. A tubular member 340 is located between the first bracket 326 and the second bracket 328. A paddle member 342 is attached to the tubular member 340. In the depicted aspect, the tubular member 340 is U-shaped and the paddle member 342 is a thermoplastic material. A ratchet latch 344 is coupled to the first bracket 326 with a ratchet mounting bracket 346. A bushing 348 is coupled to the second bracket 328. In the depicted aspect, the tubular member 340 is pivotally coupled to the ratchet latch 344 and the bushing 348. With reference to FIG. 22, in various aspects of the disclosure, when the mounting assembly 320 is attached to opposed lateral seatback frame members 330, 332, the ratchet latch 344 is selectively positionable in a plurality of predetermined intermittent positions to arrange the upper back support 322 between the stowed position and the fully raised position, as exemplarily shown with regard to upper back support 140 in FIGS. 6C and 6D. Referring to FIG. 22, a force depicted by arrow 358 is applied to extension spring 386. The tubular member 340 is rotated in the direction depicted by arrow 364 in FIG. 21. A force depicted by arrow 360 retracts the extension spring 386 of the upper back support 322 from beyond the fully raised position (overtravel position or beyond a fully deployed position) to the stowed position when the upper back support 322 is beyond the fully raised position (overtravel position or beyond a fully deployed position).

Referring again to FIG. 21, arrow 364 depicts the direction of rotation of the tubular member 340 and the paddle member 342 from the stowed position to the fully raised position. Referring to FIG. 20, the fully raised position includes alignment of an exemplary exposed top surface 236 of the upper back support 322 (exemplarily shown as upper back support 302 in FIG. 20) with a top surface 238 of a head restraint 240, as exemplarily shown in FIGS. 3A, 4, 6C, and 6D with regard to upper back support 140 upper portion 132 and head restraint 26 exposed surface 178. In its stowed position, the upper back support 322 is typically about 0° relative to the plane of the seatback 284. In the fully raised position, the upper back support 322 is typically about 15° relative to the plane of the seatback 284. The ratchet latch 344 provides a plurality of positions of the upper back support 322, and typically provides a discrete position in intervals of 1.5° between the stowed position and the fully raised position.

Figure 23:
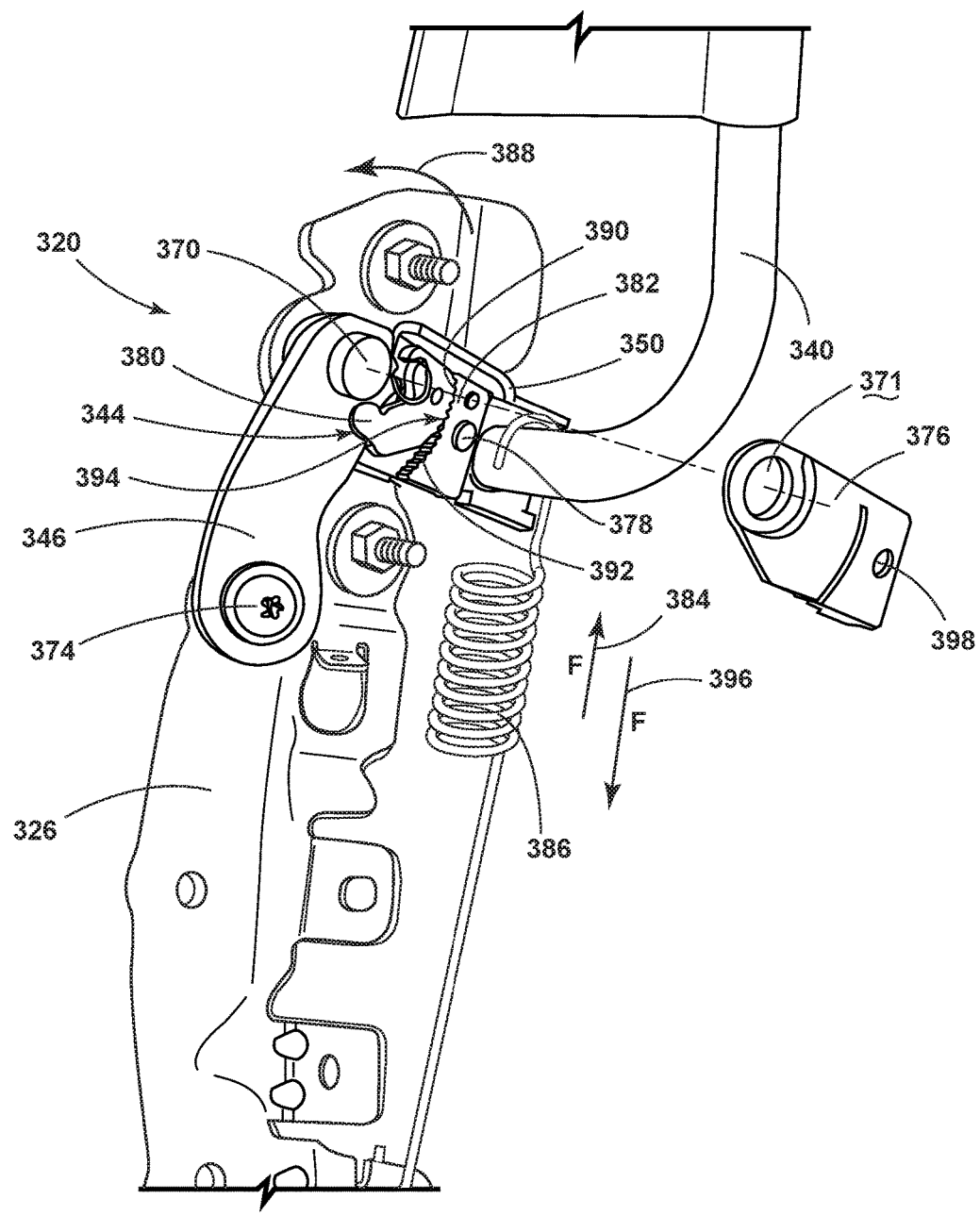
FIG. 23 is an exploded side perspective view of the second alternate aspect of the ratchet latch of the upper back support of the automotive seat assembly of FIG. 21 with the upper back support in the stowed position.

Referring to FIG. 23, the drive gear 380 and the stationary gear 382 are selectively engageable to place the tubular member 340 in one of a plurality of predetermined positions. The ratchet drive pin 370 and the fastener 374 retain the ratchet mounting bracket 346 to the first bracket 326.

Referring to FIGS. 21-23, the ratchet latch 344 includes the drive gear 380 and the stationary gear 382. The ratchet mounting bracket 346 holds the ratchet latch 344 to the first bracket 326. An extension spring 386 is coupled to the tubular member 340 and an aperture 372 in the first bracket 326.

FIG. 23 shows the ratchet latch 344 of FIGS. 21-23 with the ratchet backing plate 376 removed from the mounting assembly 320. The ratchet backing plate 376 is shown removed from the ratchet drive pin 370 and the lock pin 378. The ratchet latch 344 includes a drive gear 380 and a stationary gear 382. The ratchet drive pin 370 and the lock pin 378 hold the ratchet backing plate 376 over the drive gear 380 and the stationary gear 382. The ratchet drive pin 370 fits in aperture 371 of the ratchet backing plate 376. When the tubular member 340 is moved from the stowed position to the deployed position in the direction depicted by arrow 364 of FIG. 21, the drive bracket 350 rotates about the ratchet drive pin 370 to move the drive gear 380 in relation to the stationary gear 382. When the tubular member 340 is rotated in the direction depicted by arrow 364 in FIG. 21, then a force depicted by arrow 384 is applied to the extension spring 386, and the extension spring 386 becomes elongated. When the tubular member 340 is rotated in the direction depicted by arrow 364 in FIG. 21, then the drive bracket 350 rotates around the ratchet drive pin 370 in the direction depicted by arrow 388. As the drive gear 380 is rotated, the stationary gear 382 typically stays in place. A toothed portion 390 of drive gear 380 and a toothed portion 392 of stationary gear 382 form a toothed interface 394. The toothed interface 394 may be formed when a first toothed portion (toothed portion 390 of drive gear 380) and a second toothed portion (toothed portion 392 of stationary gear 382) become enmeshed. The toothed interface 394 between the drive gear 380 and the stationary gear 382 allows for positioning the tubular member 340 in a plurality of positions between the stowed position and the fully deployed position. When the tubular member 340 is moved beyond the fully deployed position, the drive gear 380 and the stationary gear 382 separate at the toothed interface 394 due to the force depicted by arrow 396 exerted by the return of the extension spring 386 to a non-extended position. The stationary gear 382 includes a lock pin 378. The lock pin 378 protrudes through the hole 398 in the ratchet backing plate 376. The ratchet drive pin 370 and the lock pin 378 retain the ratchet backing plate 376 over the drive gear 380 and the stationary gear 382 to keep the stationary gear 382 in a typically fixed position while the drive bracket 350 moves the drive gear 380 in relation to the stationary gear 382. The ratchet drive pin 370 fits into the aperture 371 of the ratchet backing plate 376.

Figure 24:
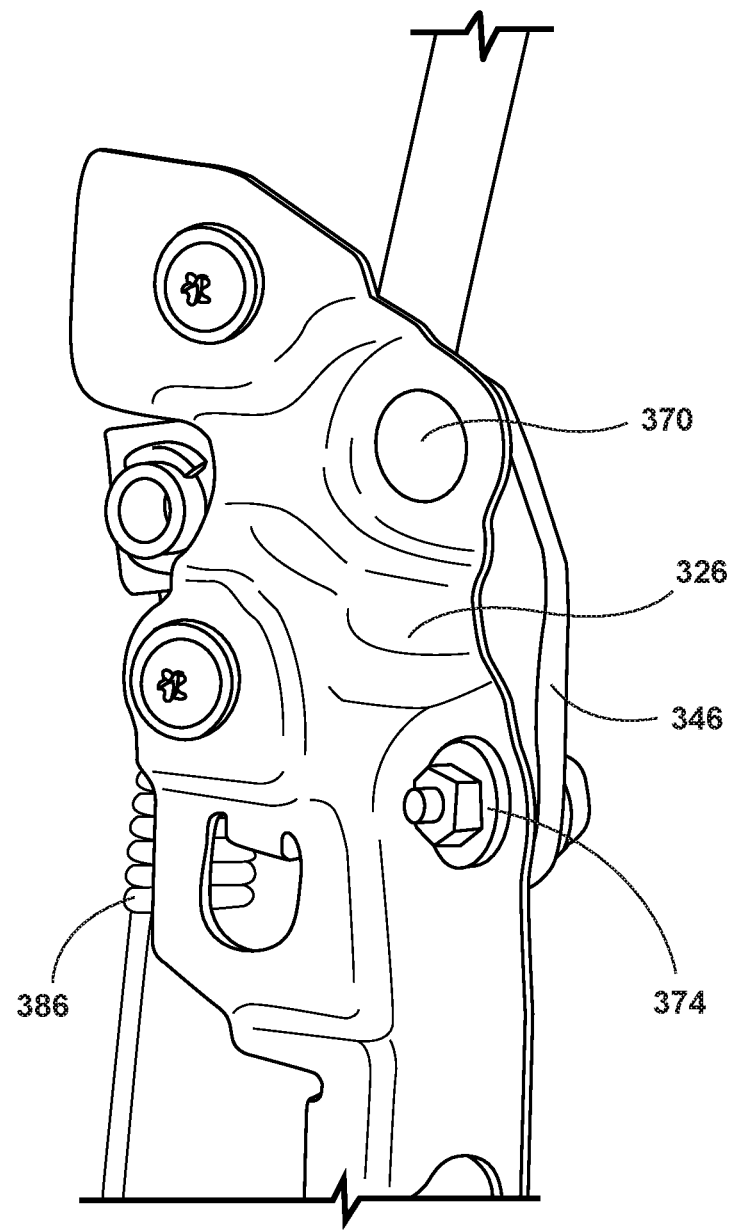
FIG. 24 is a side perspective view of the first bracket of the alternate aspect of the mounting assembly for attaching a pivotable upper back support to a vehicle seatback frame.

Referring to FIG. 24, a side view of the first bracket 326 and the extension spring 386 is shown. The ratchet drive pin 370 and the fastener 374 attach the ratchet mounting bracket 346 to the first bracket 326.

The upper back supports 202, 322 may be fabricated separately from the seatback 284. In various aspects, upper back supports 202, 322 may be trimmed and may be inserted into a trimmed seatback 284, thus providing a modular assembly solution.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

We claim:

1. A vehicle seating assembly comprising:
   a headrest;
   a seatback including a central portion and first and second lateral edges, the seatback being operable between an upright position and a reclined position;
   an upper back support including a tubular member operably coupled between a bushing and a ratchet latch, the upper back support being adjustably securable in a plurality of positions by the ratchet latch; and
   a ratchet drive bracket, wherein the tubular member is coupled to the ratchet drive bracket, the ratchet drive bracket is coupled to a drive gear of the ratchet latch, and movement of the tubular member between a stowed position and a fully deployed position causes the ratchet drive bracket to move the ratchet drive gear relative to a stationary gear.

2. The vehicle seating assembly of claim 1, further comprising:
   a ratchet mounting bracket, wherein the ratchet mounting bracket secures the ratchet latch to a first bracket proximate the first lateral edge.

3. The vehicle seating assembly of claim 2, further comprising:
   a ratchet drive pin, wherein the ratchet drive pin secures the ratchet latch to a frame member.

4. The vehicle seating assembly of claim 3, wherein the ratchet drive bracket is selectively rotatable about the ratchet drive pin to move the ratchet drive gear relative to the stationary gear.

5. The vehicle seating assembly of claim 4, further comprising:
   an extension spring comprising:
      a first end; and
      a second end, wherein the first end is fixed to the tubular member and the second end is fixed to the ratchet mounting bracket and wherein the extension spring returns the upper back support from beyond a fully deployed position to a stowed position.

6. The vehicle seating assembly of claim 4, further comprising:
   an extension spring comprising:
      a first end; and
      a second end, wherein the first end is fixed to the tubular member and the second end is fixed to the frame member and wherein the extension spring returns the upper back support from beyond a fully deployed position to a stowed position.

7. The vehicle seating assembly of claim 2, wherein the ratchet mounting bracket retains the ratchet drive gear and the stationary gear to the frame member.

8. The vehicle seating assembly of claim 2, wherein the ratchet mounting bracket retains the ratchet drive gear and the stationary gear in an engaged position.

9. The vehicle seating assembly of claim 8, wherein the ratchet drive gear comprises a first toothed portion, the stationary gear comprises a second toothed portion, and the first toothed portion and the second toothed portion are enmeshed and selectively positionable in a plurality of predetermined positions between the stowed position and the fully deployed position.

10. The vehicle seating assembly of claim 9, wherein the stowed position is about 0° relative to a plane of the seatback and the fully deployed position is about 15° relative to the plane of the seatback.

11. The vehicle seating assembly of claim 10, wherein the plurality of predetermined positions comprise intervals of 1.5° between the stowed position and the fully deployed position.

12. A seatback comprising:
    first and second frame members;
    an upper back support, wherein the upper back support comprises a tubular member and a supporting member and wherein the upper back support is located between the first and second frame members and is pivotably coupled to the first and second frame members;
    a drive bracket, wherein the tubular member is coupled to the drive bracket and wherein the drive bracket is pivotably coupled to a ratchet pin that is coupled to the first frame member;
    a ratchet mounting bracket, wherein the ratchet mounting bracket secures a ratchet latch to the first frame member, the ratchet mounting bracket is coupled to the first frame member with the ratchet pin and a second attachment, a deployment force exerted on the tubular member causes the drive bracket and a drive gear to rotate about the drive pin relative to a stationary gear and the drive gear and the stationary gear are selectively engageable to place the tubular member in one of a plurality of predetermined positions.

13. The seatback of claim 12, wherein the plurality of predetermined positions comprise:
    a stowed position;
    a raised position; and
    an overtravel position.

14. The seatback of claim 13, wherein the plurality of predetermined positions further comprise intervals of 1.5° between the stowed position and the raised position.

15. The seatback of claim 12, wherein the supporting member comprises:
    a first edge proximate a first lateral member of the seatback;
    a second edge proximate a second lateral member of the seatback;
    a top edge proximate an upper transverse cross member of the seatback; and
    a thermoplastic material forming a paddle member extending from an upper edge of the tubular member to the first edge, the second edge, and the top edge.

16. A mounting assembly for attaching a pivotable upper back support to a vehicle seatback frame comprising:
    a first bracket;
    a second bracket;
    a ratchet latch, wherein the ratchet latch is coupled to the first bracket with a ratchet mounting bracket; and
    a bushing coupled to the second bracket, wherein the upper back support includes a support member pivotably coupled to the ratchet latch and the bushing.

17. The mounting assembly for attaching a pivotable upper back support to a vehicle seatback frame of claim 16, further comprising:
    a ratchet drive pin, wherein the ratchet drive pin retains the ratchet mounting bracket to the first bracket.

18. The mounting assembly for attaching a pivotable upper back support to a vehicle seatback frame of claim 17, wherein a fully raised position includes alignment of a top surface of the upper back support with a top surface of a headrest, wherein the headrest is operably coupled to the vehicle seatback frame.

19. The mounting assembly for attaching a pivotable upper back support to a vehicle seatback frame of claim 18, wherein the support member comprises a u-shaped tubular member with an overmolded thermoplastic paddle member.

20. The mounting assembly for attaching a pivotable upper back support to a vehicle seatback frame of claim 19, wherein the ratchet latch is selectively positionable in a plurality of predetermined intermittent positions to arrange the upper back support between a stowed position and the fully raised position and wherein a spring force retracts the upper back support from beyond the fully raised position to the stowed position when the upper back support is beyond the fully raised position.

\* \* \* \* \*